US009762036B2

(12) United States Patent
Honke et al.

(10) Patent No.: US 9,762,036 B2
(45) Date of Patent: Sep. 12, 2017

(54) ELECTRIC POWER DISTRIBUTION SYSTEM

(71) Applicant: Wave Energy Inc., Tokyo (JP)

(72) Inventors: Masao Honke, Mitoyo (JP); Mitsutake Ishimoto, Mitoyo (JP)

(73) Assignee: WAVE ENERGY INC., Tokyo (JP)

( * ) Notice: Subject to any disclaimer, the term of this patent is extended or adjusted under 35 U.S.C. 154(b) by 0 days.

(21) Appl. No.: 15/121,189

(22) PCT Filed: Feb. 18, 2015

(86) PCT No.: PCT/JP2015/000773
§ 371 (c)(1),
(2) Date: Aug. 24, 2016

(87) PCT Pub. No.: WO2015/129209
PCT Pub. Date: Sep. 3, 2015

(65) Prior Publication Data
US 2016/0372897 A1    Dec. 22, 2016

(30) Foreign Application Priority Data

Feb. 25, 2014    (JP) .................................. 2014-033923

(51) Int. Cl.
*H02B 1/26*    (2006.01)
*H02B 1/20*    (2006.01)
(Continued)

(52) U.S. Cl.
CPC .................. *H02B 1/26* (2013.01); *H02B 1/56* (2013.01); *H02B 7/06* (2013.01); *H02M 5/10* (2013.01); *H02M 7/44* (2013.01); *H02B 1/202* (2013.01)

(58) Field of Classification Search
CPC . H02B 1/26; H02B 1/56; H02B 1/202; H02B 7/06; H02B 7/00–7/08; H02M 5/10; H02M 7/44
(Continued)

(56) References Cited

U.S. PATENT DOCUMENTS

2012/0300525 A1*  11/2012  Koivuluoma ............ H02B 7/00
                                                                        363/141

FOREIGN PATENT DOCUMENTS

JP        62-178707 U       11/1987
JP        04-80212 U         7/1992
(Continued)

OTHER PUBLICATIONS

"Solar Power Generation Power Transformation Unit Package 'DISOLAPACK' on Sale !," press release on website, May 30, 2012.
(Continued)

*Primary Examiner* — Zachary M Pape
(74) *Attorney, Agent, or Firm* — Leason Ellis LLP

(57) ABSTRACT

An electric power distributor comprises a distributor housing, conversion parts which convert electric current from outside of the distributor housing to low-voltage alternating current, a transformer which transforms the low-voltage alternating current from the conversion parts to high-voltage alternating current and a power transmission part which transmits the high-voltage alternating current from the transformer to the outward distributor housing. The distributor housing comprises two conversion parts—and the power transmission part—inside. The transformer is attached to the distributor housing from outside. The transformer and the power transmission part are placed along a predetermined direction in this order, the two conversion parts are placed along a direction approximately orthogonal to the predeter- (Continued)

mined direction at an opposite side to the transformer with regards to the power transmission part.

8 Claims, 27 Drawing Sheets

(51) Int. Cl.
  *H02B 1/56* (2006.01)
  *H02B 7/06* (2006.01)
  *H02M 5/10* (2006.01)
  *H02M 7/44* (2006.01)
(58) Field of Classification Search
  USPC .................................. 361/602–604, 620, 623
  See application file for complete search history.

(56) References Cited

FOREIGN PATENT DOCUMENTS

| | | |
|---|---|---|
| JP | 04-285411 A | 10/1992 |
| JP | 06-276623 A | 9/1994 |
| JP | 09-19011 A | 1/1997 |
| JP | 10-257678 A | 9/1998 |
| JP | 3056489 U | 11/1998 |
| JP | 11-225448 A | 8/1999 |
| JP | 2000-184527 A | 6/2000 |
| JP | 2003-92830 A | 3/2003 |
| JP | 2006-280178 A | 10/2006 |
| JP | 2007-37246 A | 2/2007 |
| JP | 2007-37286 A | 2/2007 |
| JP | 2007-135298 A | 5/2007 |
| JP | 2008-35635 A | 2/2008 |
| JP | 2009-284708 A | 12/2009 |
| JP | 2010-63292 A | 3/2010 |
| JP | 2011-198127 A | 10/2011 |
| JP | 2012-147621 A | 8/2012 |
| JP | 2013-243867 A | 12/2013 |
| JP | 2014-93868 A | 5/2014 |
| JP | 5761885 B | 6/2015 |

OTHER PUBLICATIONS

"JECA Fair 2012 (The 60th Electrical Construction Equipment and Materials Fair)," press release, Jul. 2, 2012.
International Search Report dated Mar. 24, 2015 for the corresponding PCT Application No. PCT/JP2015/000773.

* cited by examiner (a)

(b)

(a)

(b)

ELECTRIC POWER DISTRIBUTION SYSTEM

CROSS-REFERENCE TO RELATED PATENT APPLICATIONS

This application is a U.S. National Phase application under 35 U.S.C. §371 of International Patent Application No. PCT/JP2015/000773, filed Feb. 18, 2015, and claims the benefit of Japanese Patent Application No. 2014-033923, filed on Feb. 25, 2014, all of which are incorporated herein by reference in their entirety. The International application was published in Japanese on Sep. 3, 2015 as International Publication No. WO/2015/129209 under PCT Article 21(2).

FIELD OF THE INVENTION

A present invention relates to electric power distribution system such as V-shaped electric power distributor and so on which converts electric current flowed in from outside of a distributor housing, like solar power generation's solar battery and so on, to low-voltage alternating current, which transforms the low-voltage alternating current to higher-voltage alternating current, and which transmits the high-voltage alternating current to the outward distributor housing for special high-voltage et cetera.

BACKGROUND OF THE INVENTION

Hitherto, a transformer facility unit which comprises apparatuses required for a power transformation is known (refer to Japanese Patent Application Laid Open No. 2000-184527).

The transformer facility unit consists of a gas insulated switching device cubicle which stores a gas insulated switching device, a voltage converter main body and a cooler which radiates heat of the above voltage converter main body to be placed above the voltage converter main body, and the transformer facility unit comprises a gas insulation voltage converter which is directly connected a primary side of itself with the above gas insulated switching device cubicle and an electric power distributor which is directly connected s secondary side of itself with the gas insulation voltage converter, the transformer facility unit makes one package to install these gas insulated switching device cubicle, gas insulation voltage converter and electric power distributor on a same base, the transformer facility unit enables a transportation in a lump by trailer.

Problem to be Solved

However, the transformer facility unit disclosed in Japanese Patent Application Laid Open No. 2000-184527 is only located each of apparatuses along an electric current's flow shown in FIG. 8 of the Japanese Patent Application Laid Open No. 2000-184527 in a predetermined direction just simply in sequence.

For that reason, in the case of boosting to very high-voltage (special high-voltage et cetera) for the purpose of suppressing loss of electric power when the transformer facility unit transmits electricity from the voltage converter to distribution network et cetera, because of only locating each apparatus along electric current in a predetermined direction simply in sequence, it becomes essential that a securing of a sufficient surrounding space between the high-voltage portion (the voltage converter main body and the high-voltage and so on) and the other apparatuses, in order to avoid a user's careless contact with the high-voltage portion at an inspection and so on.

And, the transformer facility unit of the Japanese Patent Application Laid Open No. 2000-184527 extends a length of the predetermined direction, the whole unit upsizes, and it is very lengthened and enlarged that a space which is necessary for the transportation and the installation, because of only locating each apparatus along the electric current's flow simply.

Moreover, weight and capacity of the transformer facility unit of the Japanese Patent Application Laid Open No. 2000-184527 increase just as much as an outer box of each apparatus, because of making the outer box of each apparatus hollow as the refrigerant passage in the 4th embodiment of the Japanese Patent Application Laid Open No. 2000-184527 and so on.

The present invention, in view of the problems like these, aims to provide an electric power distributor which can achieve both "restraint of the careless contact" and "downsizing of the housing", according to comprising conversion parts and, a power transmission part et cetera in a distributor housing, attaching a transformer outside the distributor housing, and placing the two conversion parts along a direction approximately orthogonal to these transformer and power transmission part while placing the transformer and the power transmission part along a predetermined direction in this order et cetera.

SUMMARY OF THE INVENTION

The electric power distributor 1 of the present invention is the 1st characterized by the following; the electric power distributor comprises one distributor housing 2, conversion parts 3 which convert direct current or alternating current from outside of the distributor housing 2 to low-voltage alternating current L, a transformer 4 which transforms the low-voltage alternating current L from the conversion parts 3 to high-voltage alternating current H which is at a higher-voltage than the low-voltage alternating current L, and a power transmission part 5 which transmits the high-voltage alternating current H from the transformer 4 to the outward distributor housing 2; the distributor housing 2 comprises the two conversion parts 3 and the one power transmission part 5 inside thereof, the transformer 4 is attached to the distributor housing from outside; the electric power distributor comprises a low-voltage cable 6L which causes the low-voltage alternating current L to flow from each of the conversion parts 3 to the one transformer 4, and a high-voltage cable 6H which causes the high-voltage alternating current H to flow from the one transformer 4 to the one power transmission part 5; the one transformer 4 and the one power transmission part 5 are placed along a predetermined direction in this order; and also the two conversion parts 3 are placed along a direction approximately orthogonal to the predetermined direction at an opposite side to the transformer 4 with regards to the one power transmission part 5.

The 2nd characteristic of the electric power distributor 1 of the present invention is, in addition to the above 1st characteristic, the electric power distributor comprises two sets of low-voltage bundles 8L which are formed of the plural low-voltage cables 6L gathered, and comprises one set of high-voltage bundles 8H which is formed of the plural high-voltage cables 6H gathered; and also the two sets of the low-voltage bundles 8L and the one set of the high-voltage bundles 8H are arranged in parallel at one position across inside and outside of the distributor housing 2. Furthermore, "be arranged in parallel" in the present invention means that at least one set of the two sets of the low-voltage bundles 8L and one set of the high-voltage bundles 8H "are arranged in parallel in at least one view of a plane view, a front view and a side view".

The 3rd characteristic of the electric power distributor 1 of the present invention is, in addition to the above 1st or 2nd characteristic, each of the conversion parts 3 and the power transmission part 5 are placed within a distance of each other; and also the conversion parts 3 are mutually placed within a distance of each other.

The 4th characteristic of the electric power distributor 1 of the present invention is the electric power distributor comprises one distributor housing 2, a conversion part 3 which convert direct current or alternating current from outside of the distributor housing 2 to low-voltage alternating current L, a transformer 4 which transforms the low-voltage alternating current L from the conversion part 3 to high-voltage alternating current H which is at a higher-voltage than the low-voltage alternating current L, a power transmission part 5 which transmits the high-voltage alternating current H from the transformer 4 to the outward distributor housing 2, and an assisting apparatus 20 which assists the transmission of the power transmission part 5, the conversion of the conversion part 3 and the transformation of the transformer 4; the distributor housing 2 comprises the conversion part 3, the power transmission part 5 and the assisting apparatus 20 inside thereof, the transformer 4 is attached to the distributor housing from outside; the electric power distributor comprises a low-voltage cable 6L which causes the low-voltage alternating current L to flow from the conversion part 3 to the transformer 4, and a high-voltage cable 6H which causes the high-voltage alternating current H to flow from the transformer 4 to the power transmission part 5; the transformer 4 and the power transmission part 5 are placed along a predetermined direction in this order; and also the conversion part 3 and the assisting apparatus 20 are placed away from the transformer 4 with the power transmission part 5 as a center.

The 5th characteristic of the electric power distributor 1 of the present invention is the electric power distributor comprises one distributor housing 2, a conversion part 3 which convert direct current or alternating current from outside of the distributor housing 2 to low-voltage alternating current L, a transformer 4 which transforms the low-voltage alternating current L from the conversion part 3 to high-voltage alternating current H which is at a higher-voltage than the low-voltage alternating current L, and a power transmission part 5 which transmits the high-voltage alternating current H from the transformer 4 to the outward distributor housing 2; the distributor housing 2 comprises the conversion part 3 and the power transmission part 5 inside thereof, the transformer 4 is attached to the distributor housing from outside; a low-voltage cable 6L which causes the low-voltage alternating current L to flow from the conversion part 3 to the transformer 4 are longer than a high-voltage cable 6H which causes the high-voltage alternating current H to flow from the transformer 4 to the power transmission part 5; the high-voltage cable 6H and the low-voltage cable 6L are arranged near a distributor housing's face member at an opposite side to a distributor housing's inside space 16 in which a user of said electric power distributor can move in the distributor housing 2, with regards to inside of the distributor housing 2.

Owing to the characteristics, the power transmission part 5 becomes to be placed at closer side to the transformer 4 than the two conversion part 3 in the distributor housing 2, as a result, a length of the high-voltage cable 6H from the power transmission part 5 to the transformer 4 in the distributor housing 2 become to be shorter than a length of the low-voltage cable 6L from the conversion parts 3 to the transformer 4 in the distributor housing 2, just as much as the shortness of the high-voltage cable 6H reduces the possibility to contact with the high-voltage portion carelessly at an inspection by the user et cetera, according to comprising the two conversion parts 3 and the one power transmission part 5 in the distributor housing 2, attaching the one transformer 4 from the outside of the distributor housing 2, and placing the two conversion parts 3 to be approximately orthogonal to these transformer 4 and power transmission part 5 while placing the transformer 4 and the power transmission part 5 along a predetermined direction in this order.

At the same time as this, just as much as a housing (an outer box) of each apparatus and spaces between each of the apparatuses can make the electric power distributor 1 compact that, and it leads to reduction of the weight, as compared with the case of comprising the housing (the outer box) of every apparatus as described in Japanese Patent Application Laid Open No. 2000-184527.

That is, it can actualize the achieving both "the restraint of the careless contact" and "the downsizing of the housing".

The achieving both can similarly actualize in the case of comprising the conversion part 3 and the assisting apparatus 20 at an side inside the power transmission part 5 inside the distributor housing 2, and the case of lengthening the low-voltage cable 6L longer than the high-voltage cable 6H, and arranging the high-voltage cable 6H and the low-voltage cable 6L near the distributor housing's face member 2j at an opposite side to a distributor housing's inside space 16.

And, the electric power distributor 1 of the present invention may be called the electric power distribution system.

And, it becomes possible to arrange the low-voltage bundle 8L and the high-voltage bundle 8H in a lump at a face member (portion) of the transformer 4's side of the distributor housing 2 and we can achieve "simplification of the construction", and also we can waterproof ("facilitation of the waterproofing") by just covering at only one position across inside and outside of the distributor housing 2 and so on, in the case of installing outdoor et cetera, according to arranging the two low-voltage bundles 8L and the one high-voltage bundle 8H in parallel at one position across inside and outside of the distributor housing 2.

Moreover, we can secure the space (the distributor housing's inside space 16) which the user moves in the distributor housing 2 and performs the maintenance of the conversion parts 3 and the power transmission part 5 and so on, according to placing each conversion part 3 with a distance from the power transmission part 5, and also mutually placing the conversion parts 3 with a distance each other.

Furthermore, if the distributor housing's inside space 16 is a space which the user of the electric power distributor 1 can move in the distributor housing 2, the distributor housing's inside space 16 may be any extent and shape.

Besides, there is the case that the electric power distributor comprises an openable and closable door 7 of the distributor housing 2, and the low-voltage bundle 8L of the low-voltage cables 6L are arranged closer to the distributor housing 2 and lower position than the high-voltage bundle 8H of the high-voltage cables 6H, and are connected with the transformer 4 outside the distributor housing 2, and also the high-voltage bundle 8H which is connected with the transformer 4 comprises a portion which each high-voltage cable 6H is non-overlapped in any view of the plane view, the front view and the side view.

And, there is the case that the electric power distributor comprises a support member 10 to suppress a protruding height on the distributor housing 2's inner face 2f which is at a position relieved the ventilation of the ventilator device 9 to release air from the inside of the conversion part 3, by cutting off the projected portion from the inner face 2f.

Moreover, the electric power distributor comprises plural breakers 12 to break a direct-current cable 11 at the direct-current cable 11 to flow the direct current into the conversion part 3 from the outside of the distributor housing 2, we use a breaker for three-phase alternating current as each breaker 12 to connect an inflow side of T-phase terminal, and an outflow side of S-phase terminal of the breaker for the three-phase alternating current by a connector 13, the connector 13 is positioned only at a rear face (a rear face member) 2b's side of the distributor housing 2 with regards to the breaker 12.

For these reasons, in the case of comprising an openable and closable door 7 of the distributor housing 2, it becomes possible to arrange the low-voltage cable 6L and the high-voltage cable 6H at a position apart from the door 7, that is, we can secure a space (inspection space et cetera) between the low-voltage cable 6L and the high-voltage cable 6H to the door 7, we can enhance the maintainability, and also we can further restrain the careless contact, according to comprising the low-voltage cable 6L and the high-voltage cable 6H at the position across inside and outside of the distributor housing 2 near an opposite side to the door 7. And, it also becomes possible to install a communication apparatus at the space.

At this point, if electric power of the low-voltage cable 6L is approximately the same as the electric power of the high-voltage cable 6H, because of (electric power)=(voltage)×(electric current), it is caused that the low-voltage alternating current L which flows on the low-voltage cable 6L becomes more than the high-voltage alternating current H which flows on the high-voltage cable 6H.

Moreover, because allowable current of the cable is usually proportional to a cross-sectional area of the cable (the larger cross-sectional area of the cable is, the more electric current flows), the low-voltage bundle 8L of the low-voltage cables 6L is thicker than the high-voltage bundle 8H of the high-voltage cables, and if the low-voltage cables 6L and the high-voltage cables 6H use same copper material, the low-voltage bundle 8L of the low-voltage cables 6L can become heavier than the high-voltage bundle 8H of the high-voltage cables.

Consequently, in the case of arranging the thicken and heavy low-voltage bundle 8L of the low-voltage cables 6L at lower position than the high-voltage bundle 8H which is thinner and lighter than the low-voltage bundle 8L, we can achieve a stabilization of the low-voltage bundle 8L, and also in the case of arranging the low-voltage bundle 8L at a closer position to the distributor housing 2 than the high-voltage bundle 8H, it becomes easy to connect the thick low-voltage bundle 8L to the transformer 4 from a clearance of the thin high-voltage bundle 8H et cetera, we can enhance the maintainability of both the low-voltage cable 6L and the high-voltage cable 6H at the same time more than the maintainability of arranging inversely.

And, in the case of constituting to comprise the portion which each high-voltage cable 6H is non-overlapped in any view of the plane view, the front view and the side view, because we can maximally enlarge a distance between each high-voltage cable 6H in a limited space, in a result, we can make the electric power distributor 1 compact, at the same time, as shown in FIGS. 5, 6, if we just change a viewing angle slightly, it changes that the low-voltage cable 6L's connecting portion 4L which is seen from between each high-voltage cable 6H, it becomes further easy to connect each high-voltage cable 6H itself to the transformer 4 and to connect the low-voltage bundle 8L to the transformer 4 between each high-voltage cable 6H. Further and additionally, in the case of comprising the support member 10 to suppress the protruding height on the distributor housing 2's inner face 2f which is the position relieved the ventilation of the ventilator device 9 to release the air from the inside of the conversion part 3, by cutting off the projected portion from the inner face 2f, we can reinforce a portion comprising the support member 10 from the inner face 2f's side in the distributor housing 2, without preventing a convective flow of the air in the distributor housing 2 to be caused by the ventilation of the ventilator device 9.

Then, in the case of comprising the plural breakers 12 to break the direct-current cable 11 to the conversion part 3 from the outside of the distributor housing 2, using the breaker as each breaker 12 to connect the inflow side of T-phase terminal and the outflow side of S-phase terminal of the breaker by the connector 13, and positioning the connector 13 only at the rear face (the rear face member) 2b's side of the distributor housing 2 with regards to the breaker 12, the connector 13 is not wider than in the case of positioning the connector 13 at right and left side faces of the breaker 12, it becomes possible to closely place each adjacent breaker 12 in the front view, we can arrange more breakers 12 in a predetermined space, in a result, we can actualize to make the whole electric power distributor 1 compact.

Effect of the Invention

The electric power distributor of the present invention becomes possible to actualize the achieving both "the restraint of the careless contact" and "the downsizing of the housing" by a simple construction, according to comprising conversion parts, and a power transmission part et cetera in a distributor housing, attaching a transformer outside the distributor housing, and placing the two conversion parts along the direction approximately orthogonal to these transformer and power transmission part while placing the transformer and the power transmission part along a predetermined direction et cetera.

BRIEF DESCRIPTION OF THE DRAWINGS

These and other features and advantages of the present invention will become more readily appreciated when considered in connection with the following detailed description and appended drawings, wherein like designations denote like elements in the various views, and wherein.

DETAILED DESCRIPTION OF THE INVENTION

Figure 1:
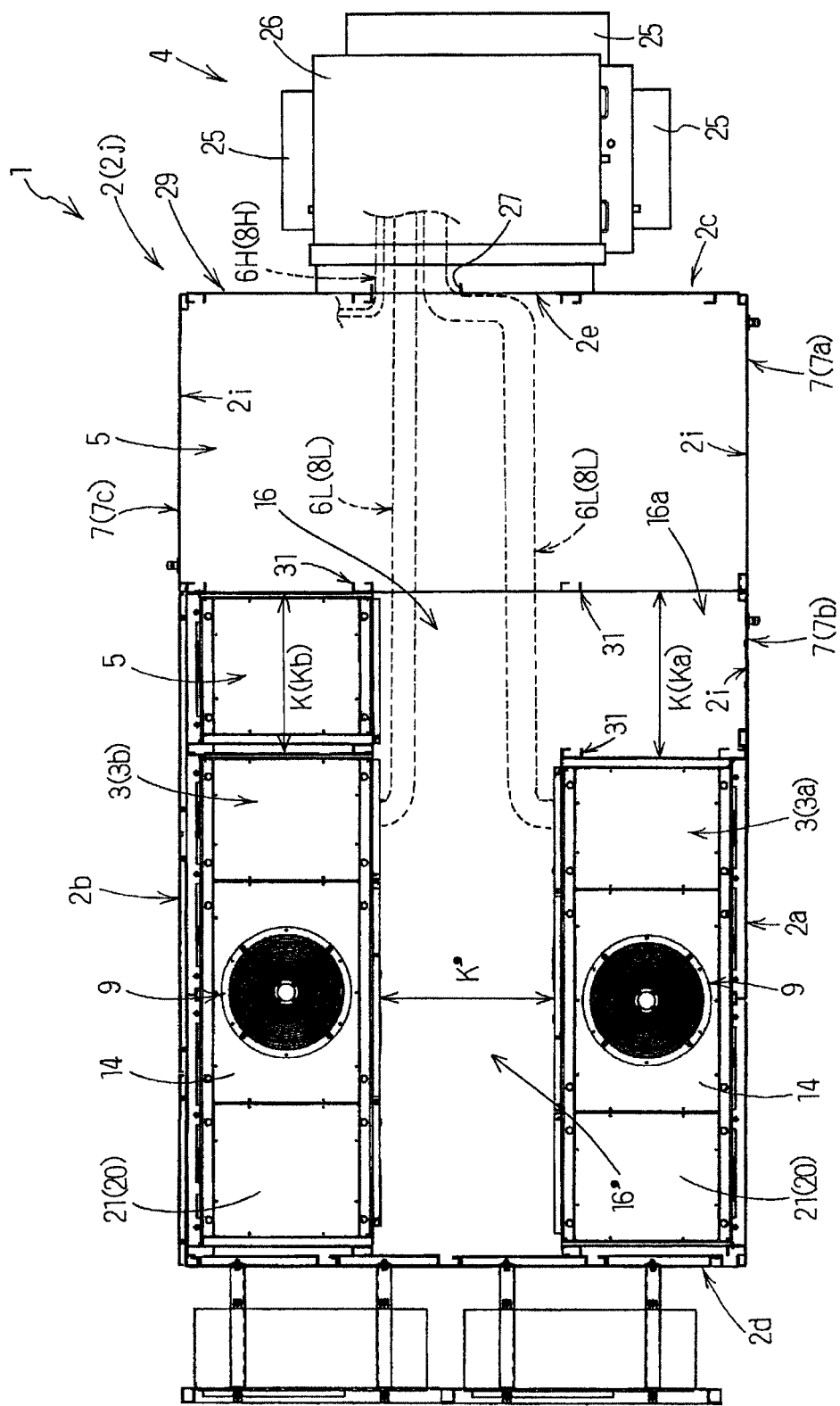
FIG. 1 shows a plane schematic view of the electric power distributor of the 1st embodiment of the present invention.
Figure 2:
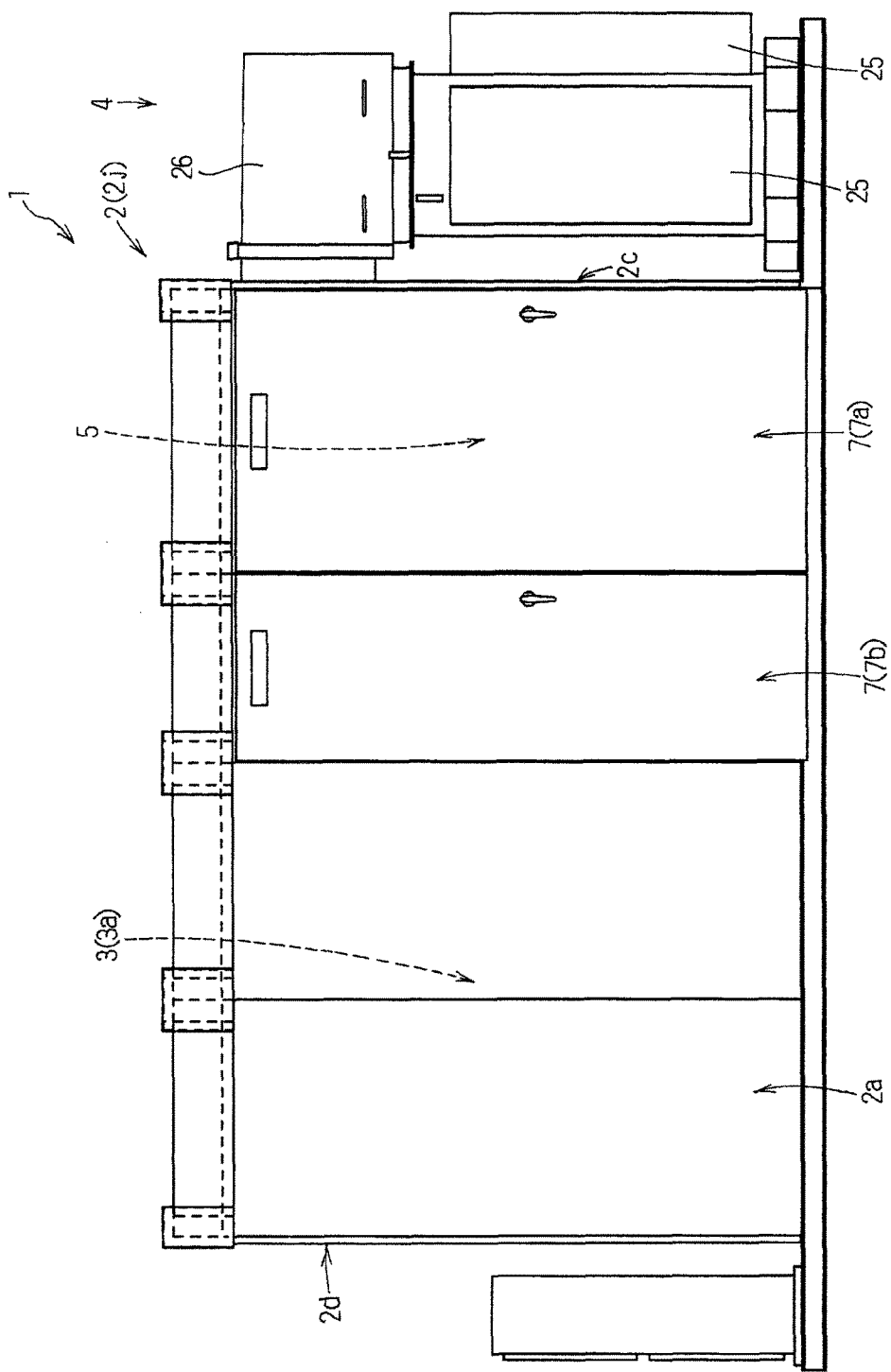
FIG. 2 shows a front schematic view of the electric power distributor of the 1st embodiment.
Figure 3:
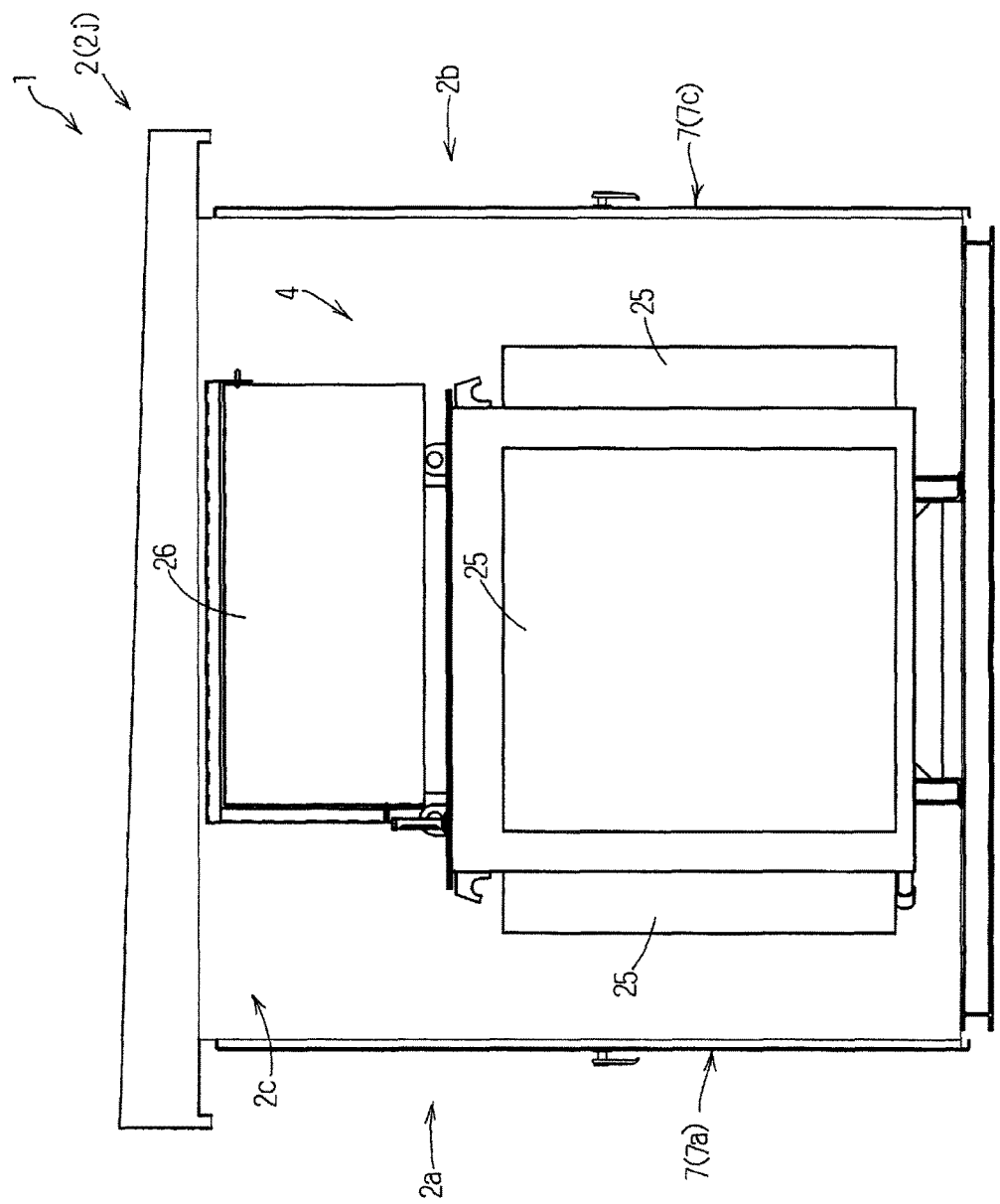
FIG. 3 shows a left side schematic view of the electric power distributor of the 1st embodiment.
Figure 4:
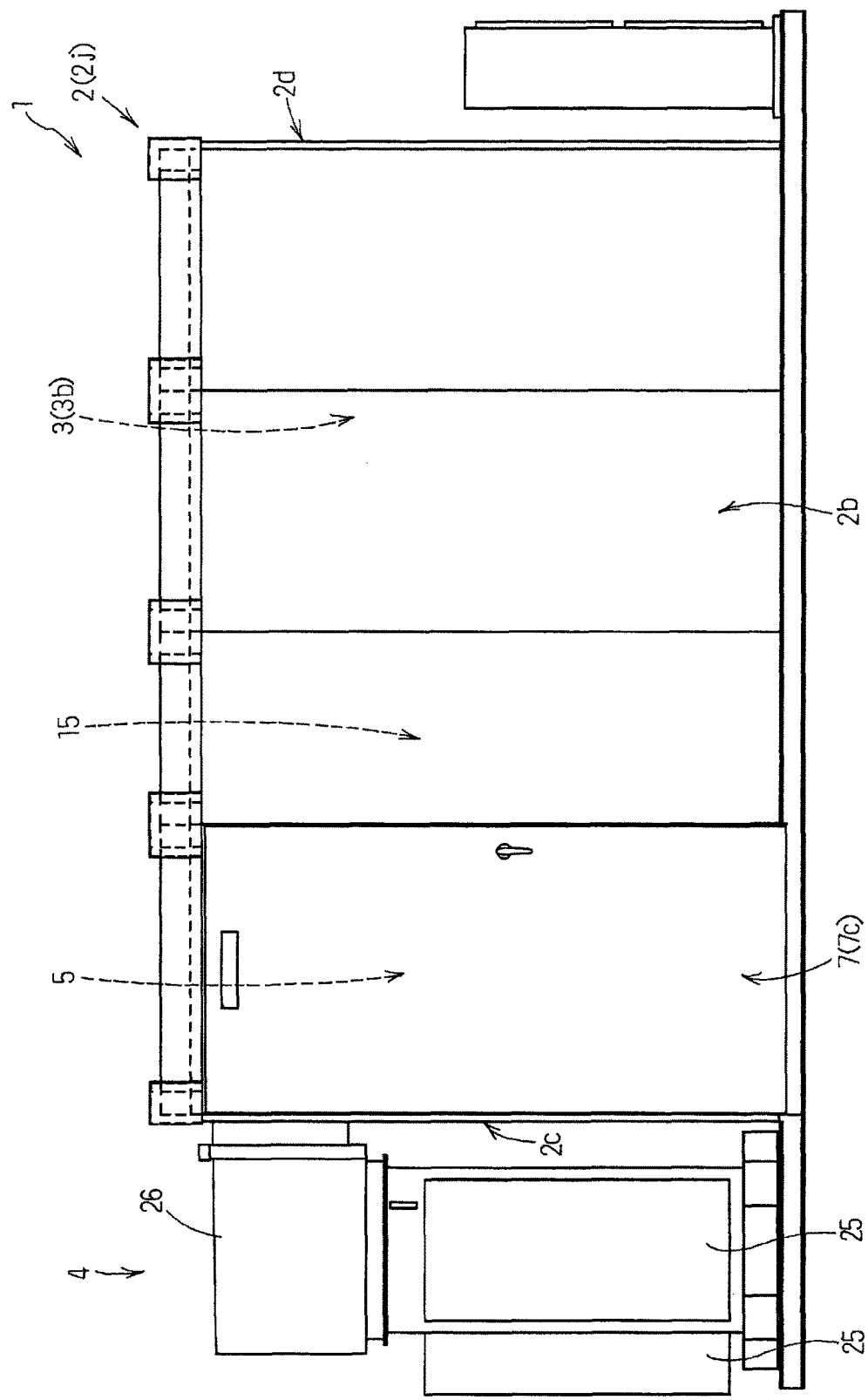
FIG. 4 shows a back schematic view of the electric power distributor of the 1st embodiment.
Figure 5:
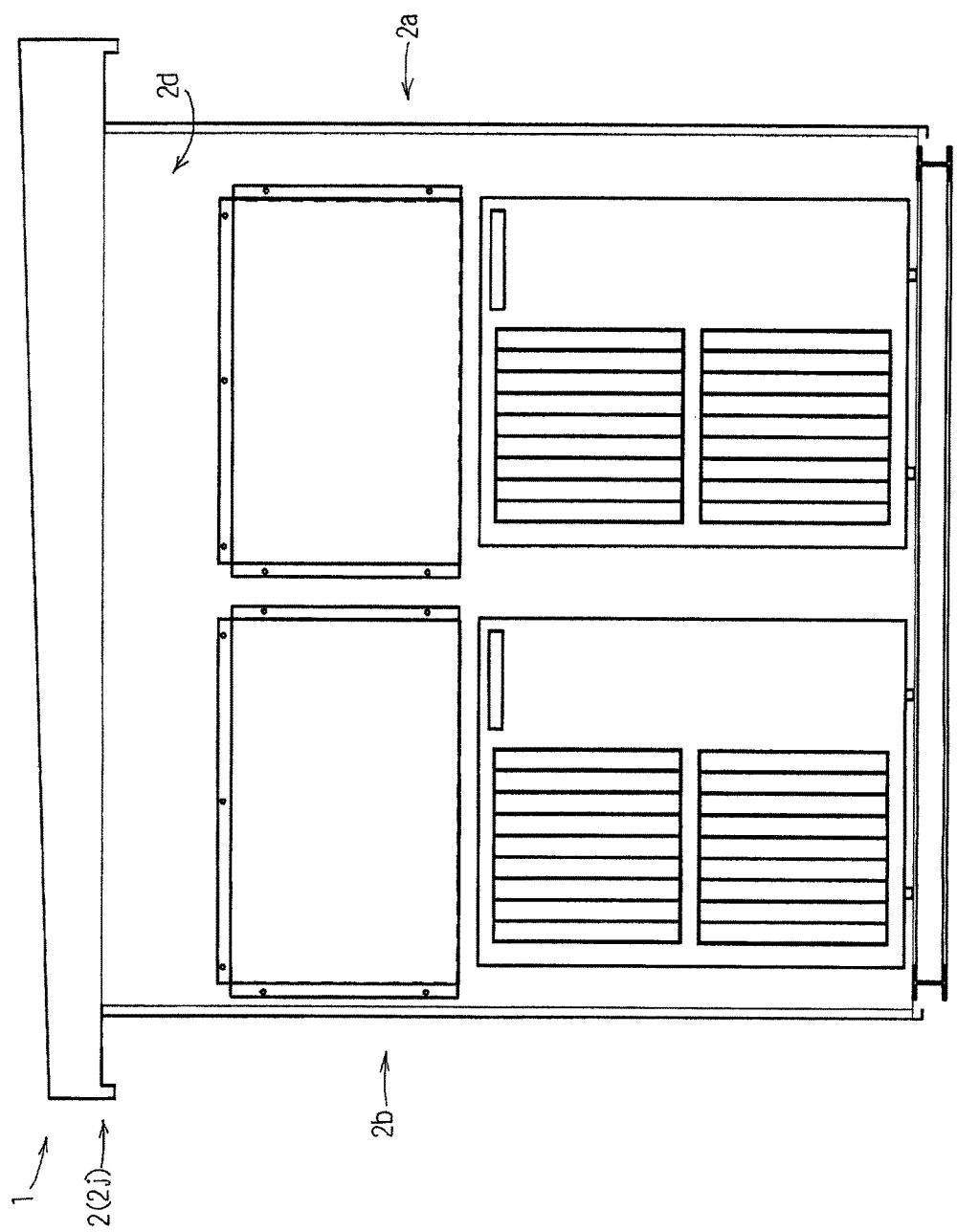
FIG. 5 shows a right side schematic view of the electric power distributor of the 1st embodiment.

The embodiments of the present invention are explained to refer to the figures below.

The 1st Embodiment

In FIGS. 1 to 12, the electric power distributor 1 of the 1st embodiment of the present invention is shown.

The electric power distributor 1 comprises one distributor housing 2, a power collection part 21 which collects the direct current from outside of the distributor housing 2 (solar batteries D et cetera), a conversion part 3 which convert the direct current which goes through the power collection part 21 to the low-voltage alternating current L, a transformer 4 which transforms the low-voltage alternating current L from the conversion parts 3 to the higher-voltage alternating current H, and a power transmission part 5 which transmits the high-voltage alternating current H from the transformer 4 to the outward distributor housing 2 (a distribution network N and an below-mentioned electric power transmitter M et cetera).

And, the electric power distributor 1 also comprises an air conditioner 22 which circulates the air in the distributor housing 2, an uninterruptible power supply (UPS) 23, and an auxiliary machine 24 which supply electric current to the above-mentioned conversion part 3, the air conditioner 22 and UPS 23 et cetera.

As shown in FIGS. 1 to 5, the electric power distributor 1 of the 1st embodiment comprises the two conversion parts 3, the one transformer 4, and the one power transmission part 5, and the two conversion parts 3 are placed along the direction approximately orthogonal to these transformer 4 and power transmission part 5 while placing the transformer 4 and the power transmission part 5 along a predetermined direction in this order.

At this point, in the case of the solar power generation plant P described later, it is the solar battery D that supplies direct current to the conversion part 3 of the electric power distributor 1 from the outside of the distributor housing 2, in the case of wind power, water power and wave power et cetera, it is a rotated generator (motor) that supplies electric current.

Furthermore, if output current from the motor is alternating current, the conversion part 3 may comprise both a converter device which converts the alternating current to direct current, and an inverter device which converts the direct current to alternating current, and if the output current is the direct current, the conversion part 3 may comprise only the inverter device, we describe in the case that the direct current flows into the conversion part 3 like the solar battery D below.

<The Distributor Housing 2>

As shown in FIGS. 1 to 5, the distributor housing 2 is formed in an approximately rectangular parallelepiped shape, the distributor housing 2 comprises doors 7 (each of a power transmission part's front door 7a, an entrance door 7b and a power transmission part's rear door 7c is openable and closable).

Furthermore, about "front and rear" of the approximately rectangular parallelepiped shaped distributor housing 2, we regard a side of the entrance door 7b as "front", and regard an opposite side to the side of the entrance door 7b as "rear".

Moreover, about "right and left" of the distributor housing 2, we regard a left-hand side of a user which goes in the distributor housing 2 at facing from "rear" to "front" of the distributor housing 2 as "left", and regard a right-hand side of the user which goes in the distributor housing 2 at facing from "rear" to "front" of the distributor housing 2 as "right".

Consequently, it can be said that the transformer 4 is attached at a left face 2c (an outer face of a left face member 2c, an right outer face in FIG. 1) of the distributor housing 2, and, an outdoor device of the air conditioner 22 is attached at a right face 2d (an outer face of a right face member 2d, an left outer face in FIG. 1) of the distributor housing 2.

Furthermore, obviously, the transformer 4 and the outdoor device of the air conditioner 22 et cetera may be attached at the face member of the right and left reversed side of the distributor housing 2.

The power transmission part's front door 7a is placed at the closest position to the transformer 4 (that is, the power transmission part's front door 7a is adjacent to the transformer 4) in a front face (a front face member) 2a of the distributor housing 2, the power transmission part's rear door 7c is placed at the closest position to the transformer 4 (that is, the power transmission part's rear door 7c is adjacent to the transformer 4) in a rear face (a rear face member) 2b of the distributor housing 2. And, the entrance door 7b, which is adjacent to the power transmission part's front door 7a, is placed at an opposite side to the transformer 4 (a side away from the transformer 4) in the front face (the front face member) 2a of the distributor housing 2. 23]

If the user can go in and out the distributor housing 2, it may be not necessarily that the entrance door 7b is adjacent to the power transmission part's front door 7a, for example, the entrance door 7b may be placed at a position which is the right face 2d (the right face member 2d) of the distributor housing 2 and a position to dodge (to avoid) the outdoor device of the air conditioner 22 et cetera.

Furthermore, an inner part of the distributor housing 2 is reinforce by a support part member 31 which partitions and supports a 24 power collection part 21, the conversion part 3 and the power transmission part 5 et cetera, and if the above-mentioned power transmission part's front door 7a and the power transmission part's rear door 7c can open and close a space which the power transmission part 5 is placed in the distributor housing 2, the front door 7a and the rear door 7c may be placed at the support part member 31.

<The Power Collection Part 21, Breaker 12>

Figure 6:
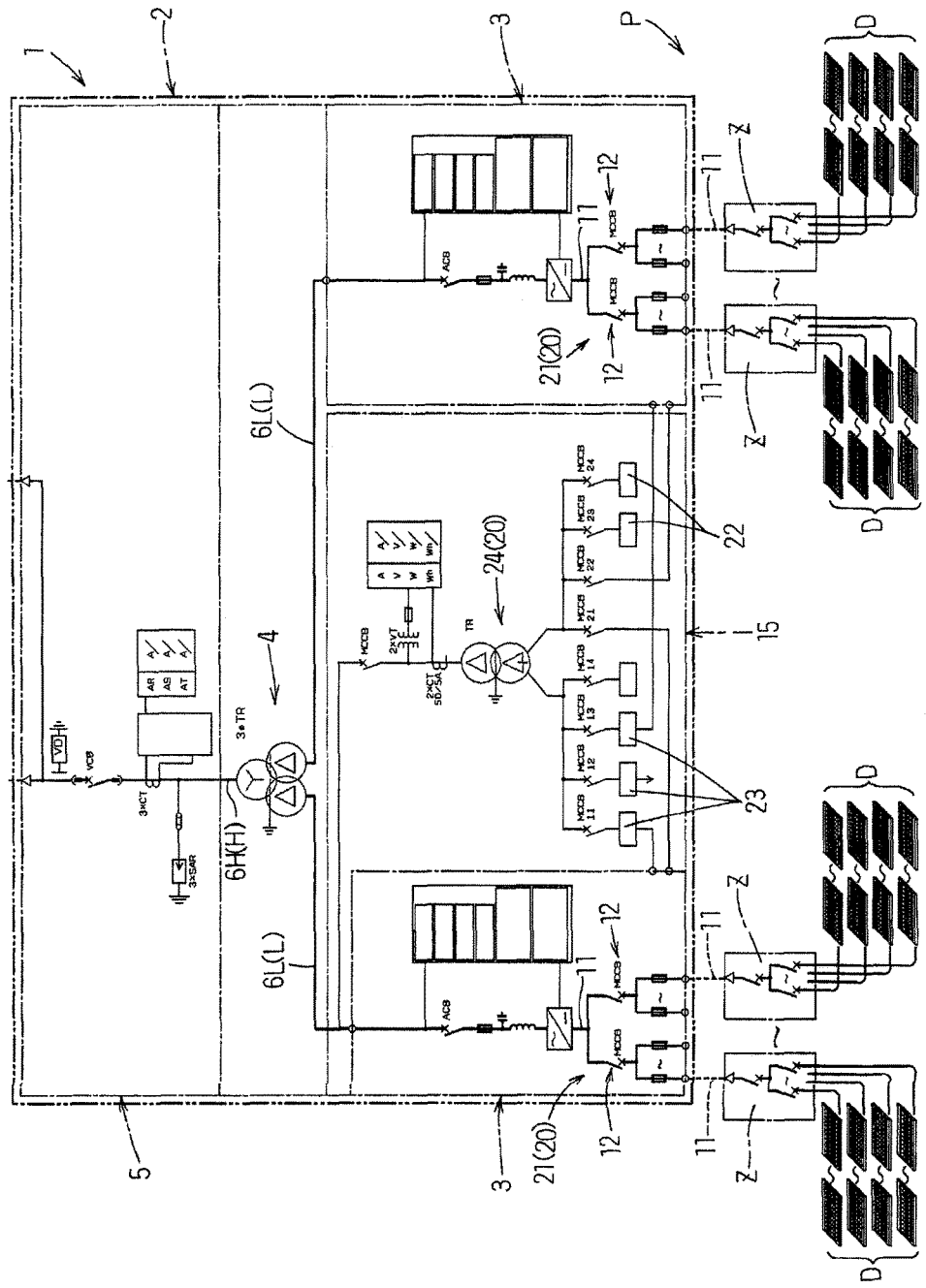
FIG. 6 shows a circuit diagram of the electric power distributor of the 1st embodiment.

As shown in FIGS. 1, 6, the power collection part 21 is placed at a space which the conversion part 3 is placed. Furthermore, the power collection part 21 may be placed at a separate space from the conversion part 3 like the 2nd embodiment described later.

If the power collection part 21 collects the direct current from the outside of the distributor housing 2, a constitution of the power collection part 21 is not particularly limited, for example, the power collection part 21 is placed at a right part (a left part in FIG. 1) in the distributor housing 2, pairs of the right and left plural breakers 12 are arranged along an upward and downward direction.

The breaker 12 may be any constitution, for example, the constitution of the breaker 12 may be a constitution of the 2nd embodiment described below.

Furthermore, because not only the conversion of the conversion part 3 but also the transformation by the transformer 4 and the power transmission of the power transmission part 5 can't perform without going through the power collection part 21, the power collection part 21 is included the assisting apparatus 20 which assists the power transmission of the power transmission part 5, the conversion of the conversion part 3 and the transformation of the transformer 4.

And, it can be said that the assisting apparatus 20 (the power collection part 21) at a same space as the conversion part 3 is placed away from the transformer 4 with the power transmission part 5 as the center.

<The Conversion Part 3>

As shown in FIGS. 1, 6, the conversion part 3 comprises the inverter device which converts the direct current from the solar battery D to the low-voltage alternating current L (for example, 100 to 200V et cetera), a control part which controls voltage and frequency of the alternating current which the inverter device converts, and an air circuit breaker (ACB) et cetera.

These inverter device, control part and breaker et cetera are arranged in a converter housing 14, the converter housing 14 comprises a rotary fan-shaped ventilator device 9 which releases the air of an inner part of the converter housing 14.

A constitution of the ventilator device 9 is not particularly limited, for example, the constitution of the ventilator device 9 may be a constitution of the 2nd embodiment described below.

Furthermore, such conversion part 3 also is called Pawacon (Pawacon is an abbreviation for a Power conditioner).

The two conversion part 3, as mentioned above, are placed in the one distributor housing 2, in the distributor housing 2, the two conversion parts 3 are placed along the direction approximately orthogonal to the predetermined direction along which the one transformer 4 and the one power transmission part 5 are placed in this order and at the opposite side to the transformer 4 with regards to the one power transmission part 5.

This also can be said that the one transformer 4 and the one power transmission part 5 are placed along the predetermined direction in this order, and also the two conversion parts 3 are placed away (at least one view of the plane view, the front view and the side view) from the transformer 4 with the one power transmission part 5 as the center.

Moreover, in other words, it also can be said that the two conversion parts 3 are placed to be branched from the power transmission part 5 while the one transformer 4 and the one power transmission part 5 are placed along the predetermined direction as a base end, and the one transformer 4, the one power transmission part 5 and the two conversion part 3 are placed in an approximately V-shaped in the plane view According to placing like these, the power transmission part 5 becomes to be arranged at the closer side to the transformer 4 than the two conversion parts 3 in the distributor housing 2, as a result, the length of the high-voltage cable 6H from the power transmission part 5 to the transformer 4 in the distributor housing 2 becomes shorter than the length of the low-voltage cable 6L from the conversion parts 3 to the transformer 4 in the distributor housing 2, just as much as the shortness of the high-voltage cable 6H reduces the possibility to contact with the high-voltage portion carelessly at the inspection by the user et cetera.

At the same time as this, as described in Japanese Patent Application Laid Open No. 2000-184527, just as much as the housing (the outer box) of each apparatus and spaces between each of the apparatuses can make the electric power distributor 1 compact that, and it leads to reduction of the weight, as compared with the case of comprising the housing (the outer box) of every apparatus.

That is, it can actualize the achieving both "the restraint of the careless contact" and "the downsizing of the housing".

As described the position of each conversion part 3 in detail, one conversion part 3 is placed at the front face (the front face member) 2a's side of the distributor housing 2 and at the opposite side to the transformer 4 (a side away from the transformer 4) with regards to the entrance door 7b.

That is, the one conversion part 3 (a front conversion part 3a) is placed with a distance K (a distance (a front distance) Ka between the front conversion part 3a and the power transmission part 5) from the power transmission part 5, and if the front distance Ka is a distance to be able to secure the space (the distributor housing's inside space 16) which the user gone in from the entrance door 7b moves in the distributor housing 2 and performs the maintenance of the conversion parts 3 and the power transmission part 5 and so on, the front distance Ka may be any value. Furthermore, if the distributor housing's inside space 16 is a space which the user of the electric power distributor 1 can move in the distributor housing 2, the distributor housing's inside space 16 may be any extent and shape.

It can be said that the other conversion part 3 is placed at the rear face (the rear face member) 2b's side in the distributor housing 2 and at the opposite side to the transformer 4 (a side away from the transformer 4) with regards to the power transmission part 5 through a space which the above air conditioner 22, the UPS 23 and the auxiliary machine 24 et cetera are placed, and a rear conversion part 3b also is placed with a distance K (a distance (a rear distance) Kb between the rear conversion part 3b and the power transmission part 5) from the power transmission part 5.

If the rear distance Kb is a distance to be able to secure the sufficient space which the above air conditioner 22, the UPS 23 and the auxiliary machine 24 et cetera are placed, the rear distance Kb may be any value.

Furthermore, electric current of lower voltage than the high-voltage alternating current H transformed (boosted) by the transformer 4 in the air conditioner 22, the UPS 23 and the auxiliary machine 24 et cetera, like the conversion part 3.

Consequently, we regard the space (portion) which these air conditioner 22, UPS 23 and auxiliary machine 24 et cetera are placed as a low-voltage part 15.

And, the two conversion parts 3a, 3b are mutually placed with a distance (a mutual distance between the front conversion part 3a and the rear conversion part 3b) K' each other, and if the mutual distance K', in the same way as the front distance Ka, is a distance to be able to secure the space which the user moves in the distributor housing 2 and performs the maintenance of the conversion parts 3 and the power transmission part 5 and so on, the mutual distance K' may be any value.

Furthermore, as shown in FIG. 1, the distributor housing's inside space 16 of the electric power distributor 1 of the 1st embodiment is formed in an approximately L-shaped in the plane view.

The distributor housing's inside space 16 of the 1st embodiment, as described in detail, comprises a space 16' between conversion parts (the space 16' is between the two conversion parts 3a, 3b with a mutual distance K'), and a space 16a between the conversion part and the power transmission part (the space 16a is from the one end of the space 16' to the entrance door 7b through between the front conversion part 3a and the power transmission part 5 with a mutual distance which is the distance Ka).

<The Transformer 4>

As shown in FIGS. 1, 6, the transformer (trans) 4 is, as it is called, a voltage converter, and the transformer 4 transforms the low-voltage alternating current L (for example, 100 to 200V et cetera) from each conversion part 3 to the high-voltage alternating current H (for example, 22000V or 6600V et cetera) which is suitable for the power transmission.

Furthermore, the trans is an abbreviation for the transformer.

The transformer 4, as mentioned above, is attached at the left face 2c (the outer face of the left face member 2c) of the distributor housing 2 from outside, and the transformer 4 comprises a main body which is formed in an approximately rectangular parallelepiped shape, plural radiation fins 25 which stands on from three faces of four outer side faces excluding a face of the distributor housing 2's side, and a connection cover 26 which is formed in an approximately rectangular parallelepiped shape on an upper face of the main body of the transformer 4. The connection cover 26 covers a connecting portion (connection terminal) with the low-voltage bundle 8L of the low-voltage cables 6L from the distributor housing 2 to the transformer 4, and a connecting portion (connection terminal) with the high-voltage bundle 8H of the high-voltage cables 6H to the transformer 4. Furthermore, a specific constitution of the connection cover 26 may be any constitution, and the connection cover 26 may have a constitution which a rear part 26b remains on the upper face of the main body of the transformer 4 after removing the connection cover 26.

Furthermore, the low-voltage bundle 8L of the low-voltage cables 6L is a bundle of the low-voltage cables 6L which is formed of the plural low-voltage cables 6L gathered, and the high-voltage bundle 8H of the high-voltage cables 6H is a bundle of the high-voltage cables 6H which is formed of the plural high-voltage cables 6H gathered.

These low-voltage bundle 8L and high-voltage bundle 8H go out an upper side of the transformer 4 in the outside of the distributor housing 2 through only one insertion hole 27 (the position across inside and outside of the distributor housing 2) which is placed at the left face (the left face member) 2c of the distributor housing 2.

At this point, because the conversion parts 3 is two machines, the power transmission part 5 is one machine, the electric power distributor 1 comprises two sets of the low-voltage bundles 8L, and the electric power distributor 1 comprises one set of the high-voltage bundles 8H.

As we say, the two sets of the low-voltage bundles 8L are placed to be branched from the insertion hole 27 as a base end toward the two conversion parts 3 (refer to FIG. 1).

Furthermore, one set of the low-voltage bundle 8L includes what the plural low-voltage bundles 8L gathers and becomes one set, and one set of the high-voltage bundles 8H also, in the same way as the low-voltage bundle 8L, includes what the plural high-voltage bundles 8H gathers and becomes one set.

And, the two sets of the low-voltage bundles 8L and the one set of the high-voltage bundles 8H are placed in parallel at the insertion hole 27, this means that each bundle of at least one set of the two sets of the low-voltage bundles 8L and the one set of the high-voltage bundles 8H "is placed in parallel (approximately parallel) in at least one view of the plane view, the front view and the side view".

From this, it becomes possible to arrange the low-voltage bundle 8L and the high-voltage bundle 8H in a lump at a face member (portion) of the transformer 4's side of the distributor housing 2 and we can achieve "simplification of the construction", and we can achieve space-saving at the insertion hole 27 which the cables concentrated most, because each bundle 8L, 8H put in order along a longer direction of each cable 6L, 6H.

Further and additionally, we can waterproof ("facilitation of the waterproofing") by just covering at only one position across inside and outside of the distributor housing 2, in the case of installing outdoor et cetera.

Furthermore, the low-voltage bundle 8L of the low-voltage cables 6L may be arranged at the closer position to the distributor housing 2 and lower position than the high-voltage bundle 8H of the high-voltage cables 6H in the outside of the distributor housing 2, in particular, the high-voltage bundle 8H may comprise a portion which each high-voltage cable 6H is non-overlapped in any view of the plane view, the front view and the side view.

And, as shown in FIG. 1, about some of the mentioned low-voltage cable 6L (the low-voltage bundle 8L) and the high-voltage cable 6H (the high-voltage bundle 8H), the low-voltage cable 6L may be longer than the high-voltage cable 6H in the electric power distributor 1 of the 1st embodiment.

<The Power Transmission Part 5>

As shown in FIGS. 1, 6, the power transmission part 5 is positioned only at the left part (the right part in FIG. 1) which is the closest side to the transformer 4 in the distributor housing 2 (the left face (the left face member) 2c's side attaching the transformer 4), and the power transmission part 5 comprises a vacuum circuit breaker (VCB) and a surge arrester (SAR) and so on.

The power transmission part 5 may be a power transmittable constitution to conduct the distribution network N finally like the constitution which the power transmission part 5 connects the distribution network N through a distribution cable G as an outer part of the distributor housing 2, and the power transmission part 5 connects the distribution network N through the electric power transmitter M which collects the electric power from the plural electric power distributor 1 and transmits and so on.

The bundles 8L, 8H of each cable 6L, 6H which goes in and out through the insertion hole 27 of the distributor housing 2 may lengthen to nearby the VCB at an approximately same height as the insertion hole 27 or at a little higher position than the insertion hole 27 with regards to the power transmission part 5, and the bundle 8L, 8H of each cable 6L, 6H may lengthen downward along an inner side face 2e (an inner face of an side face member 2e (the left face member 2c, the right face member 2d)), immediately after going in the inner part of the distributor housing 2 from the insertion hole 27.

Furthermore, it also can be said that the power transmission part 5 is a special high-voltage part in the case of transmitting special high-voltage electric power (for example, 22000V et cetera), it also can be said that the power transmission part 5 is a transmitter.

<The Air Conditioner 22, UPS 23, Auxiliary Machine 24>

As shown in FIG. 6, the air conditioner 22 and the UPS 23 are supplied the electric current (the electric power) from the auxiliary machine 24.

If the air conditioner 22 can circulate the air in the distributor housing 2, the air conditioner 22 may be placed at any position such as an upper part of a right and left parts in the distributor housing 2 and a middle position in the forward and backward direction in the distributor housing 2.

The UPS 23 is a device which supplies electricity to each part for a while even under a power failure and so on.

The auxiliary machine 24 comprises a auxiliary machine's transformer (a voltage converter) and a breaker, the auxiliary machine 24 supplies electric power to a control power supply, a fan power supply, the air conditioner 22 and the UPS 23 with regards to the conversion part 3, and an illumination in the distributor housing 2, a plug socket et cetera.

Furthermore, the conversion part 3 can't convert electric current without the auxiliary machine 24, because the auxiliary machine 24 supplies the control power supply.

Moreover, it also can be said that if the conversion part 3 can't convert, the transformation by the transformer 4 and the power transmission of the power transmission part 5 can't perform. Consequently, there also may be the case that the auxiliary machine 24 is included the assisting apparatus 20 which assists the power of the transmission power transmission part 5, the conversion of the conversion part 3 and the transformation of the transformer 4.

And, it can be said that the assisting apparatus 20 which include the above-mentioned auxiliary machine 24 or the power collection part 21, in the same way as the conversion part 3, is placed away from the transformer 4 with the power transmission part 5 as the center.

From this, the power transmission part 5 becomes to be placed at closer side to the transformer 4 than the assisting apparatus 20 in the distributor housing 2, as a result, the length of the high-voltage cable 6H from the power transmission part 5 to the transformer 4 in the distributor housing 2 become to be as shot as possible, it reduces the possibility to contact with the high-voltage portion carelessly at the inspection of the assisting apparatus 20 by the user et cetera.

<The Solar Power Generation Plant P>

Figure 7:
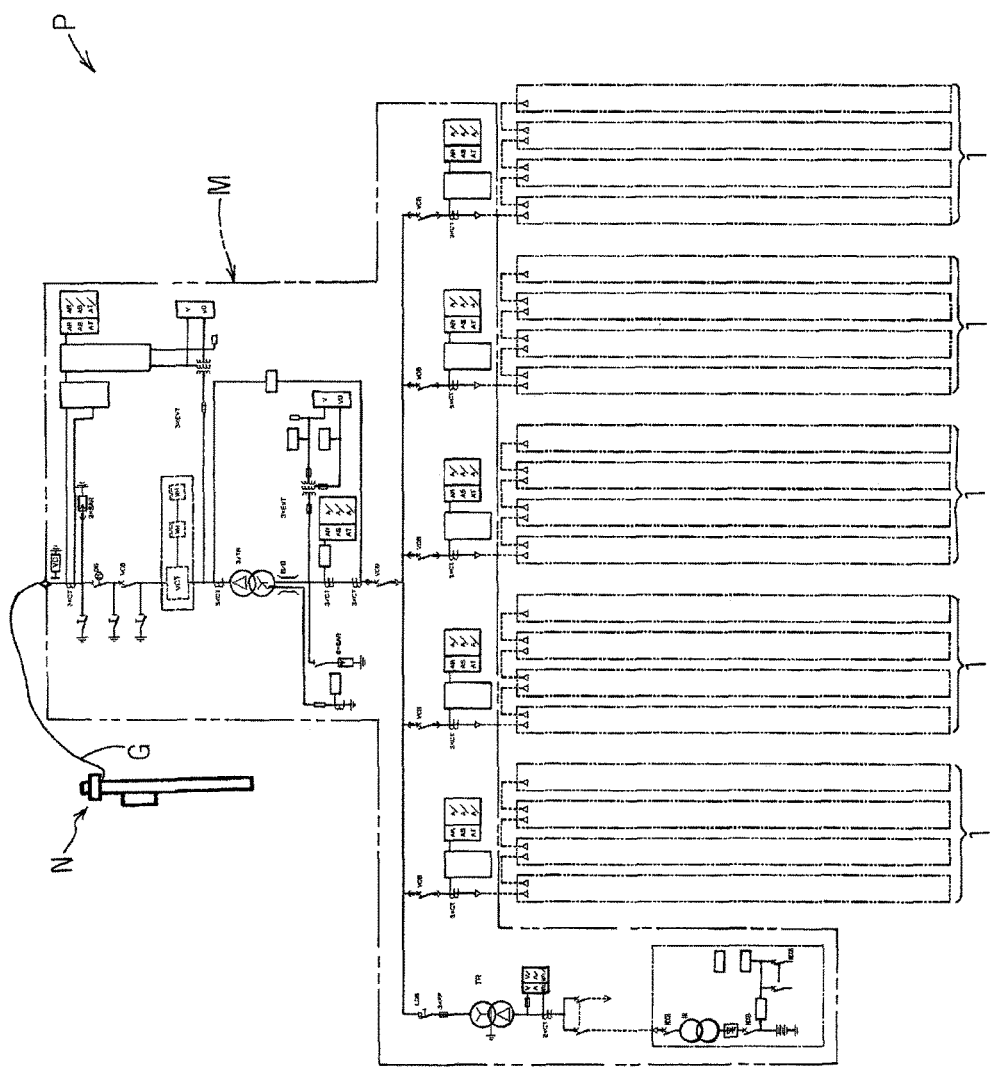
FIG. 7 shows a schematic view of a solar power generation plant which comprises the plural electric power distributors of the 1st embodiment.
Figure 8:
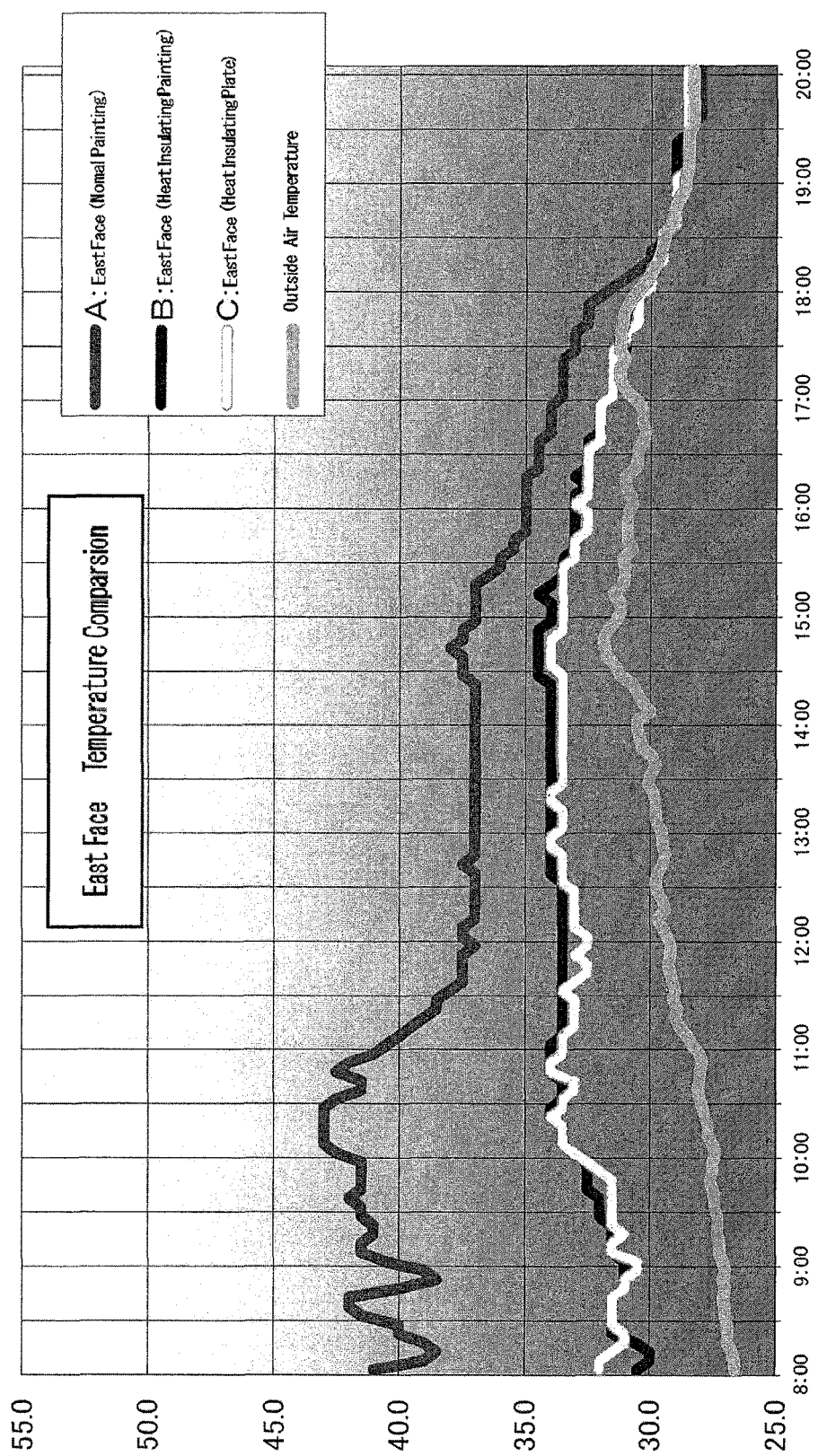
FIG. 8 shows a graph which compares temperature changes of a normal painting, a heat insulating painting and a heat insulating plate with regards to an east-facing outer faces (an east faces) of housings (boxes).
Figure 9:
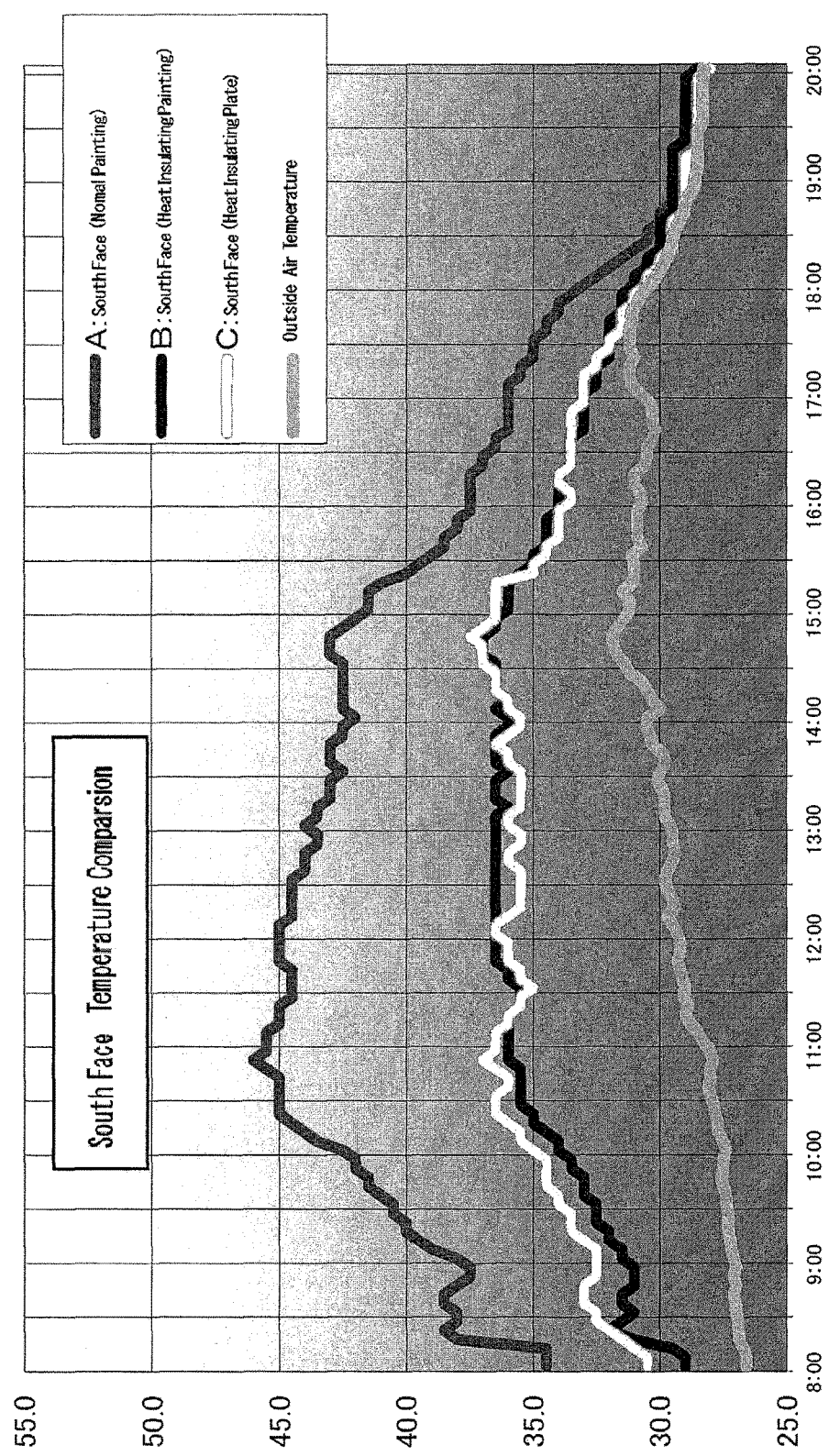
FIG. 9 shows a graph which compares the temperature changes of the normal painting, the heat insulating painting and the heat insulating plate with regards to a south-facing outer faces (a south faces) of the housings (the boxes).
Figure 10:
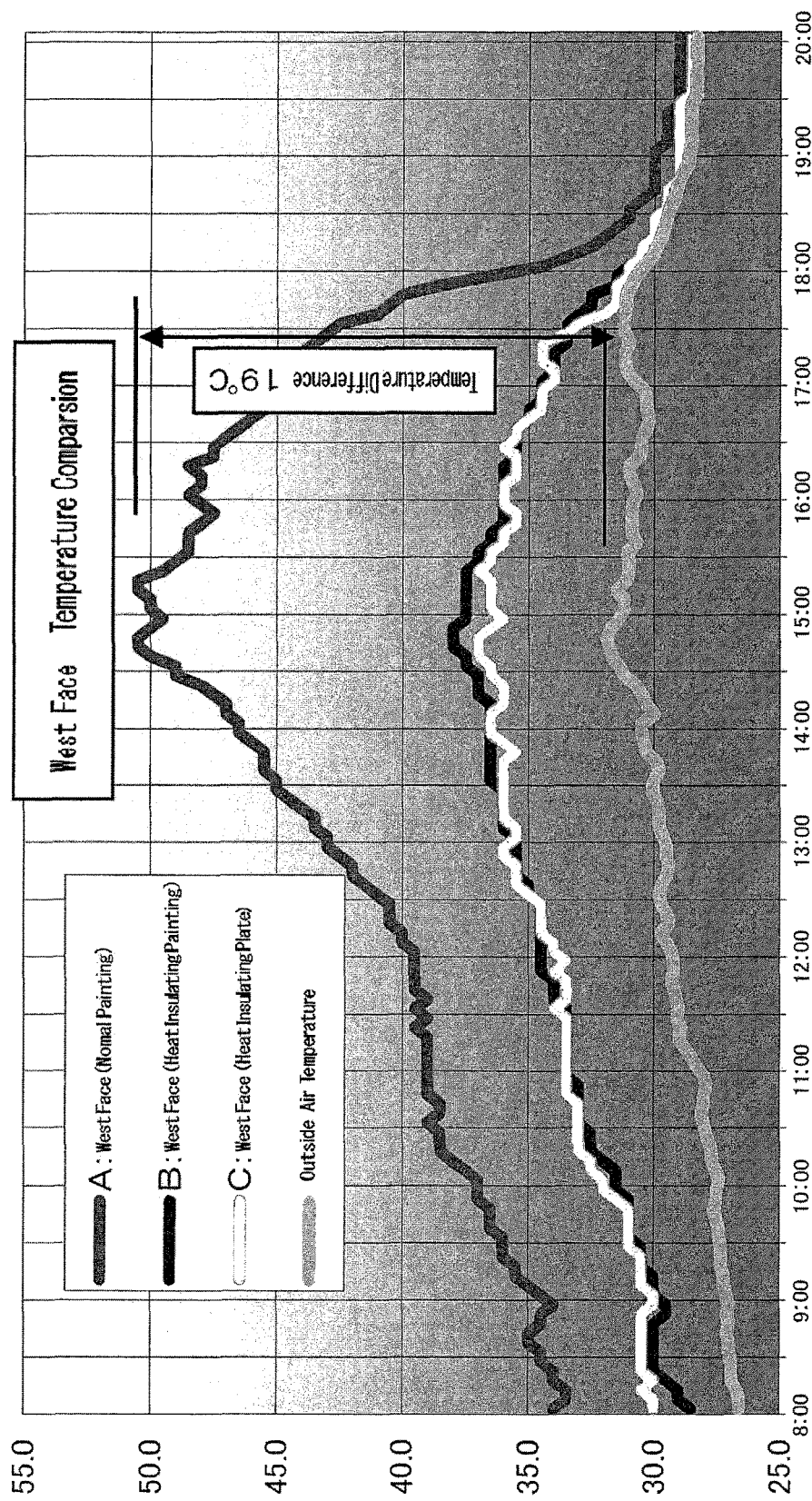
FIG. 10 shows a graph which compares the temperature changes of the normal painting, the heat insulating painting and the heat insulating plate with regards to a west-facing outer faces (a west faces) of the housings (the boxes).
Figure 11:
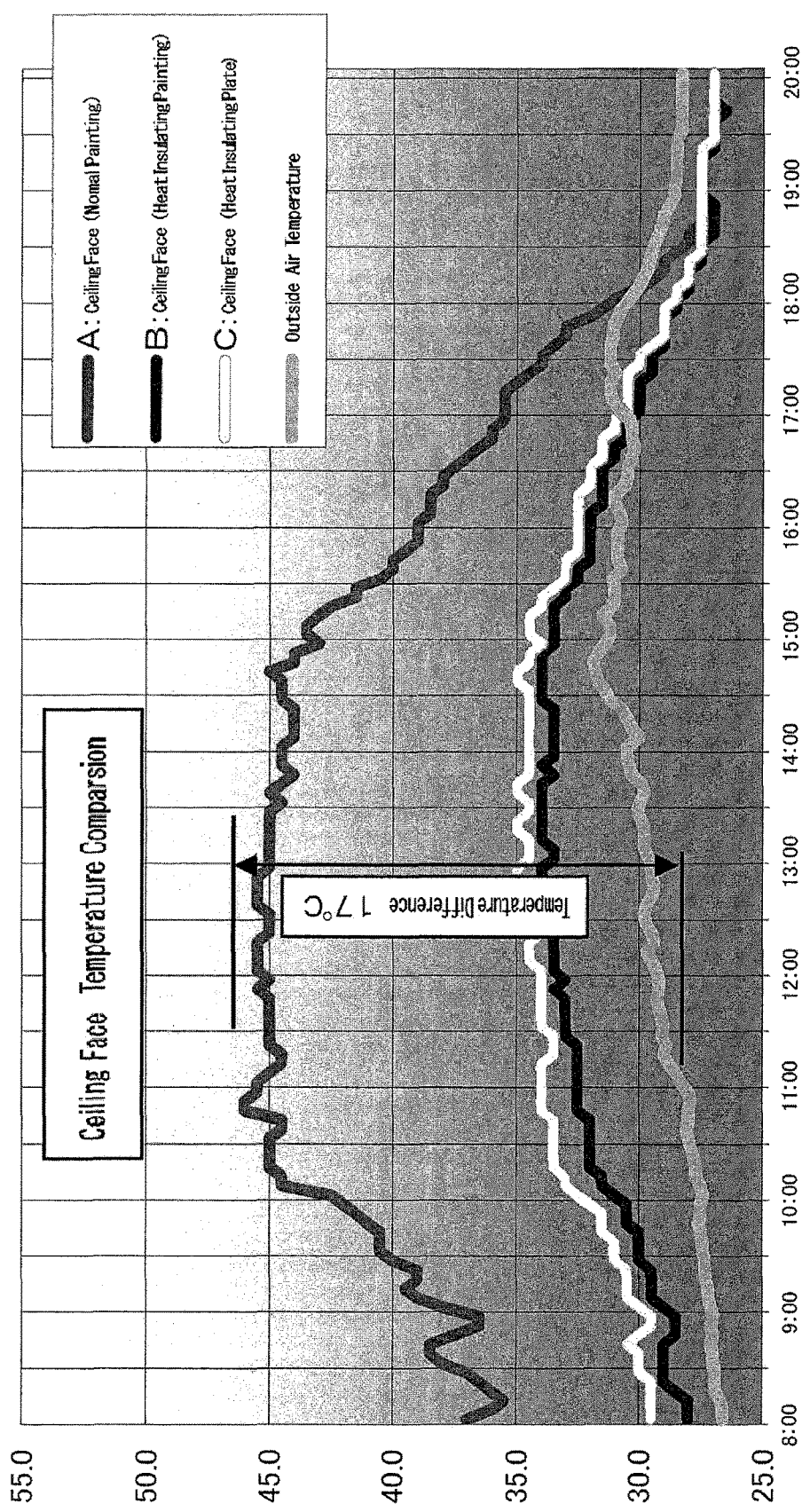
FIG. 11 shows a graph which compares the temperature changes of the normal painting, the heat insulating painting and the heat insulating plate with regards to a north-facing outer faces (a north faces) of the housings (the boxes).
Figure 12:
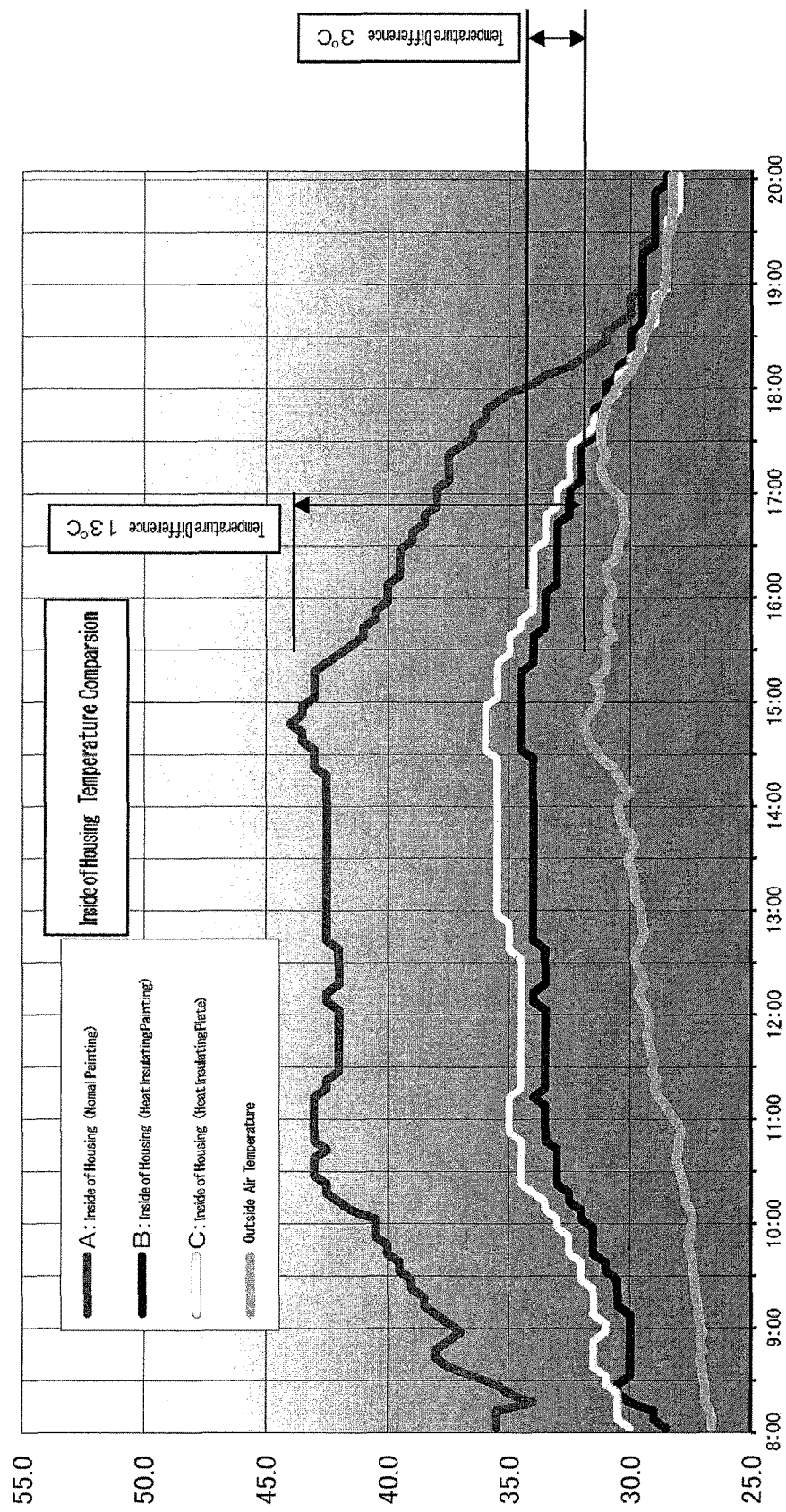
FIG. 12 shows a graph which compares the temperature changes of the normal painting, the heat insulating painting and the heat insulating plate with regards to a ceiling face of the housings (the boxes).

Over the FIG. 6 and FIG. 7, the solar power generation plant P which comprises the electric power distributor 1 of the 1st embodiment of the present invention is shown.

The solar power generation plant P comprises the many solar batteries D, plural connection boxes Z (with breaker et cetera) which conduct every predetermined number of the solar batteries D of these many solar batteries D, the plural electric power distributors 1 which conduct all these plural connection boxes Z, the electric power transmitter M which collects these plural electric power distributors 1, the distribution cable G which conducts the electric power transmitter M to the distribution network N having an electric pole et cetera as a terminal end, and an electrical energy meter which measures electric energy which flow in the distribution cable G.

Furthermore, the electrical energy meter is attached at the solar power generation plant P comprises not only when we sell the electric power to the distribution network N, but also when we purchase the electric power from the distribution network N.

And, voltage at the time of transmitting from the electric power transmitter M to the distribution network N finally may be voltage (for example, 6600V et cetera) to be able to sell the electric power and to purchase the electric power, it may be not necessarily that the voltage to be able to sell the electric power and to purchase the electric power between the electric power transmitter M and the plural electric power distributors 1, and voltage which the electric power distributor 1 transmits to the electric power transmitter M may be higher-voltage (for example, 22000V et cetera as the special high-voltage) than the voltage to be able to sell the electric power and to purchase the electric power. In this case, the electric power transmitter M comprises a voltage converter to step down to the voltage to be able to sell the electric power and to purchase the electric power.

And, the solar batteries D, the connection boxes Z, the electric power distributors 1 and the electric power transmitter M are arrayed depending on an extent and a shape of a land to install the solar batteries D, the connection boxes Z, the electric power distributors 1 and the electric power transmitter M, for example, we may regard generation power of the one electric power distributor 1 as 1500 kW (750 kW per each conversion part 3), and the solar power generation plant P may comprise plural systems of the electric power distributors 1 (for example, the generation power of 10 or more systems of the electric power distributors 1 is 15000 kW (15 MW) or more, and the generation power of 20 or more systems of the electric power distributors 1 is 30000 kW (30 MW) or more)

In the solar power generation plant P which comprises the above-mentioned constitution, the plural solar batteries D are tilted to lower in proportion as going to south for the purpose of raising the power generation capacity. If the solar power generation plant P can obtain the sufficient power generation capacity, the angle to tilt the plural solar batteries D may be any degree, for example, 5 degrees et cetera. And, solar light obviously shines on not only the solar batteries D, but also the electric power distributor 1 itself, a temperature rising in the electric power distributor 1 et cetera is caused by the solar light's shining on the electric power distributor 1 itself.

And so, we describe the heat insulating treatment with regards to the electric power distributor 1 below.

<The Heat Insulating Treatment>

At this point, FIGS. 8 to 12 show that how a surface temperature of the distributor housing 2's east-facing face member (that is, the east face), the south face, the west face and a ceiling face (an outer face of a ceiling face member 2g), and a temperature of the inner part of the distributor housing 2 change with executing or not heat insulating treatment and the difference of the treating method, in the case of facing the four faces (the front face member 2a, the rear face member 2b, the left face member 2c and the right face member 2d) of three type housings (boxes) on north, south, east and west outdoors and in the daytime.

Furthermore, three type housings are a normal painting housing not to execute the heat insulating treatment (A in FIGS. 8 to 12), a housing to execute the heat insulating painting (B in FIGS. 8 to 12) and a housing which executes the heat insulating painting on the ceiling face (the outer face of the ceiling face member 2g) and is attached the heat insulating plate at the east face, the south face and the west face (C in FIGS. 8 to 12).

And, measuring day was 19 Aug. 2009, the weather of the day was fine weather.

As shown in FIGS. 8 to 12, it becomes possible to lower the temperature of the inner part of the distributor housing 2 by about ten degrees, according to executing the heat insulating treatment more than the case of the normal painting. And, it is known that the temperature rising of the west face shined on by an evening sun is considerably more (the weltering sun is stronger) than the temperature rising of the east face mainly shined on by a morning sun, as compared with FIGS. 8, 10. Furthermore, it can be said that the heat insulating painting and the heat insulating plate have approximately same special quality.

And so, the electric power distributor 1 which faces the entrance door 7b (or the front face (the front face member) 2a) on north may execute the heat insulating painting on the ceiling outer face (the outer face of the ceiling face member 2g) of the electric power distributor 1, and be attached a heat insulating plate 29 at a south-faced rear outer face (an outer face of the rear face member 2b), and an upper part (an upward portion from the transformer 4) of a west-faced left face 2c (an outer face of the left face member 2c) through a supporter, like the 2nd embodiment. Furthermore, it is hard to conduct the heat to the distributor housing 2's side, in the case of attaching the heat insulating plate 29 with a little clearance between the outer face of the distributor housing 2 and the heat insulating plate 29.

Moreover, because the heat insulating plate 29 is attached perpendicularly (along the vertical direction), if a rubbish et cetera goes in the clearance, the rubbish fall down from the clearance by wind which passes through the clearance, it is hard that the heat also is accumulated.

And, the heat insulating painting may be executed on an upper part of the left face 2c (an outer face of the left face member 2c) of the electric power distributor 1.

The 2nd Embodiment

In FIGS. 13 to 24, the electric power distributor 1 of the 2nd embodiment of the present invention is shown.

A most different point between the 1st embodiment and the 2nd embodiment is a point that the electric power distributor 1 comprises only one conversion part 3. That is, the electric power distributor 1 of the 2nd embodiment comprises the one conversion part 3, the one transformer 4 and the one power transmission part 5, and the transformer 4, the power transmission part 5 and the conversion part 3 are placed along a direction from the left face 2c (the left face member 2c) toward the right face 2d (the right face member 2d) in this order.

Furthermore, obviously, the transformer 4, the power transmission part 5 and the conversion part 3 may be placed along a direction from the right face 2d (the right face member 2d) toward the left face 2c (the left face member 2c) in this order. If the transformer 4, the power transmission part 5 and the conversion part 3 are placed along any direction, it can be said that the transformer 4 and the power transmission part 5 are placed along the predetermined direction in this order, and also at least the conversion part 3 is placed away from the transformer 4 with the power transmission part 5 as the center.

<The Distributor Housing 2>

As shown in FIGS. 13 to 16, the distributor housing 2 of the 2nd embodiment also is formed in an approximately rectangular parallelepiped shape, the distributor housing 2 comprises four openable and closable doors 7 (we regard a side having these four doors 7 as the front face (the front face member) 2a).

Furthermore, it also can be said that any door of these four doors 7 is the entrance door 7b, because these four doors allow the user to go in and out.

And, the electric power distributor 1 of the 2nd embodiment also comprises the distributor housing's inside space 16 which the user gone in from the entrance door 7b moves in the distributor housing 2 and performs the maintenance of the conversion parts 3 and the power transmission part 5 and so on, in the same way as the 1st embodiment, if the distributor housing's inside space 16 is a space which the user of the electric power distributor 1 can move in the distributor housing 2, the distributor housing's inside space 16 may be any extent and shape.

The distributor housing's inside space 16 of the 2nd embodiment, as described in detail, is a space between the front face (the front face member) 2a having each door 7 in the distributor housing 2, and the conversion part, the power transmission part, the power collection part 21 and assisting apparatus 20 et cetera.

Figure 13:
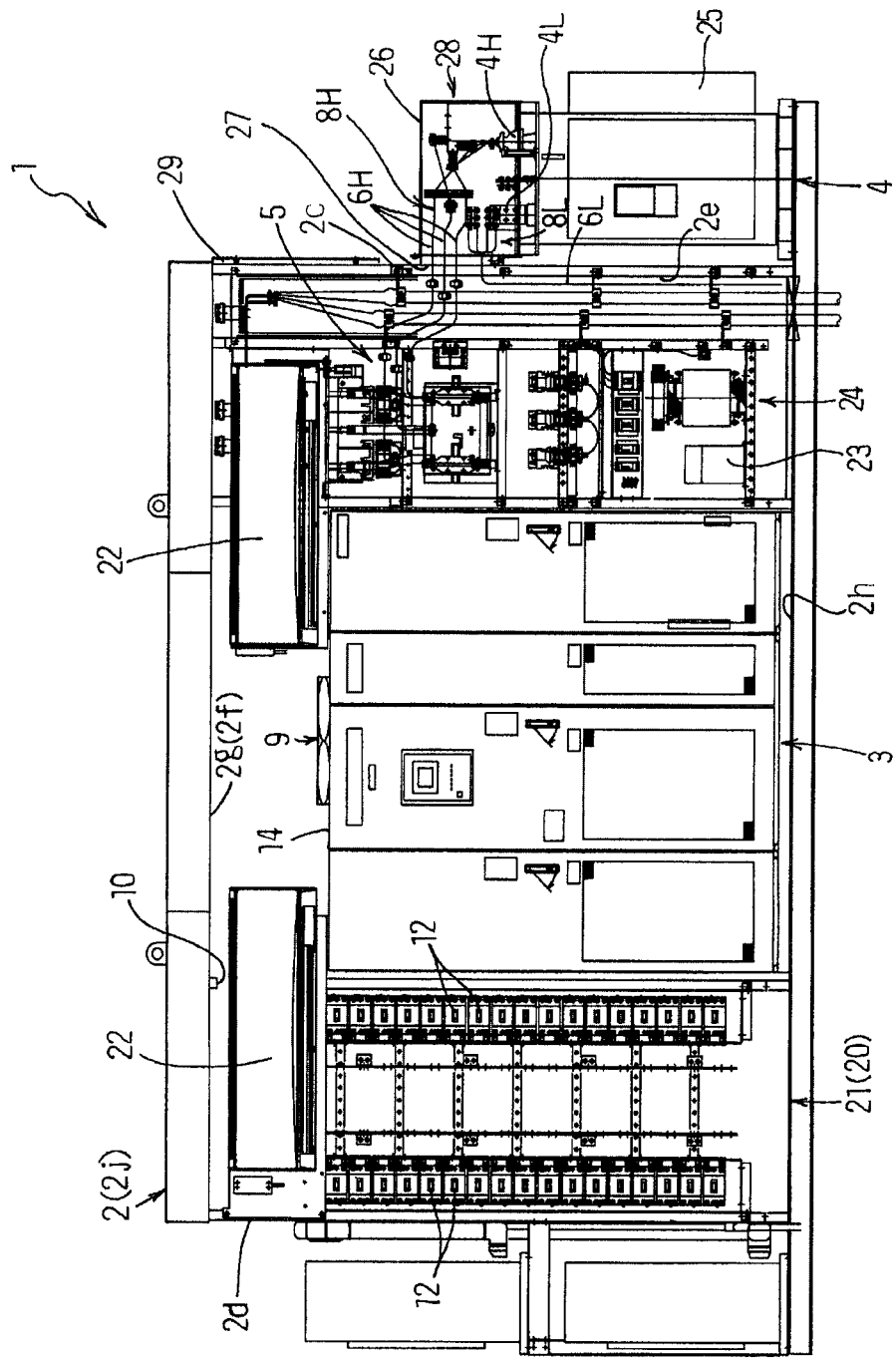
FIG. 13 shows a front schematic view of an internal construction of the electric power distributor of the 2nd embodiment of the present invention.

The transformer 4 is attached at the left face 2c (the outer face of the left face member 2c, the right outer face in FIG. 13) of the distributor housing 2, and the outdoor device of the air conditioner 22 is attached at the right face 2d (the outer face of the right face member 2d, the left outer face in FIG. 13) of the distributor housing 2.

The inner part of the distributor housing 2 is reinforce by a support part member which partitions and supports the power collection part 21, the conversion part 3 and the power transmission part 5 et cetera, and the below-mentioned support member 10 and so on.

<The Power Collection Part 21, Breaker 12>

Figure 14:
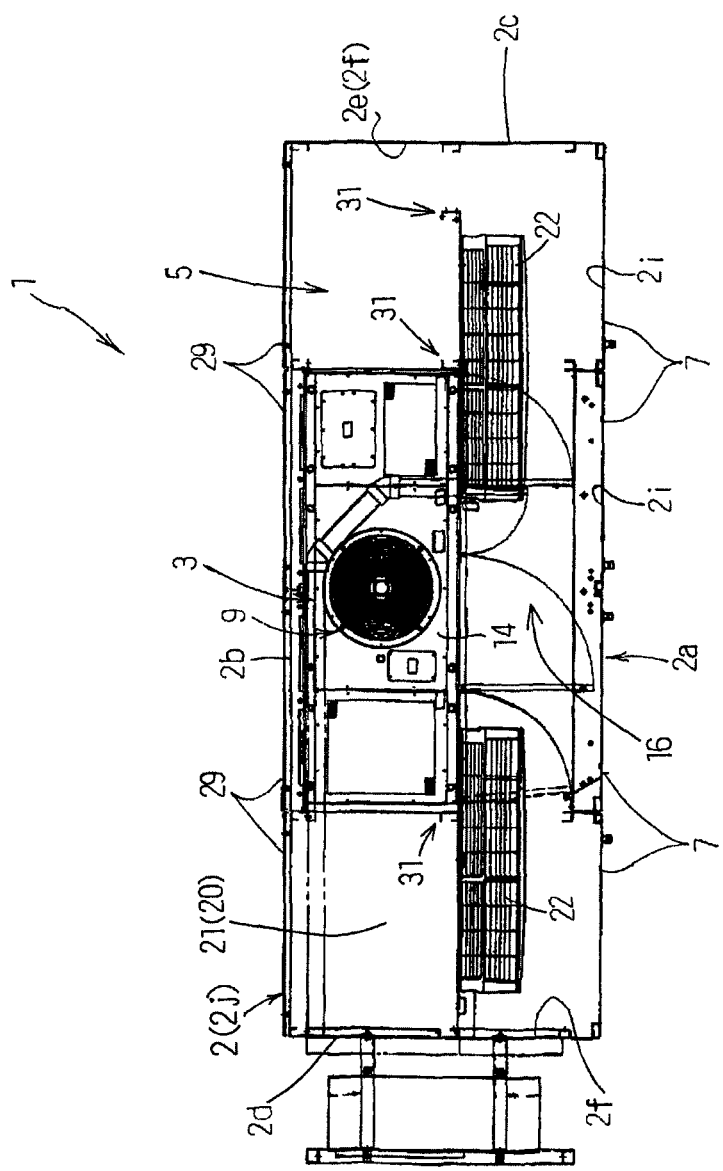
FIG. 14 shows a plane schematic view of the internal construction of the electric power distributor of the 2nd embodiment.
Figure 15:
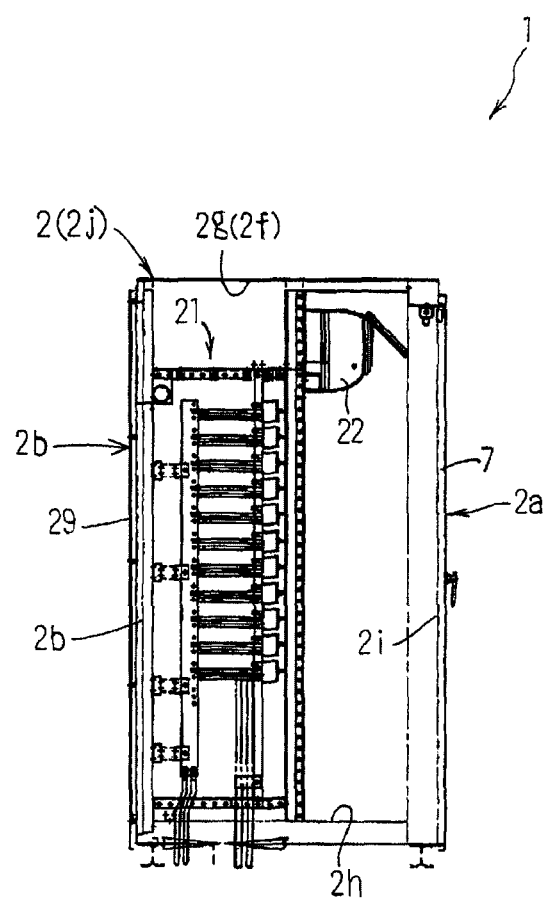
FIG. 15 shows a side schematic view of the internal construction of the electric power distributor of the 2nd embodiment.
Figure 16:
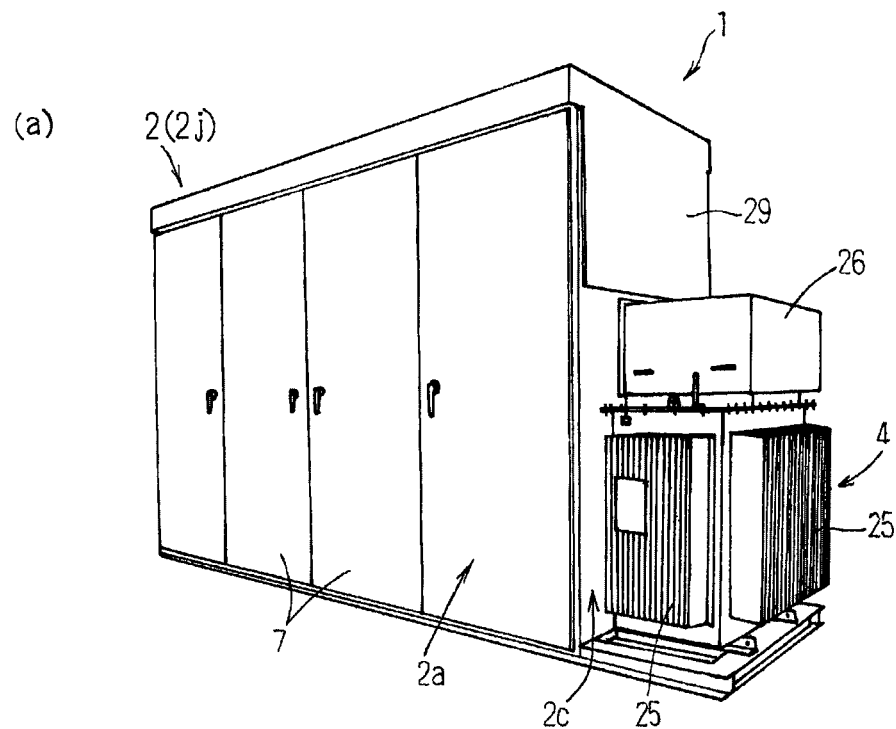
FIG. 16(a) shows a front oblique perspective view of an exterior of the electric power distributor of the 2nd embodiment.
FIG. 16(b) shows a back oblique perspective view (rear oblique perspective view) of the exterior of the electric power distributor of the 2nd embodiment.
Figure 16:
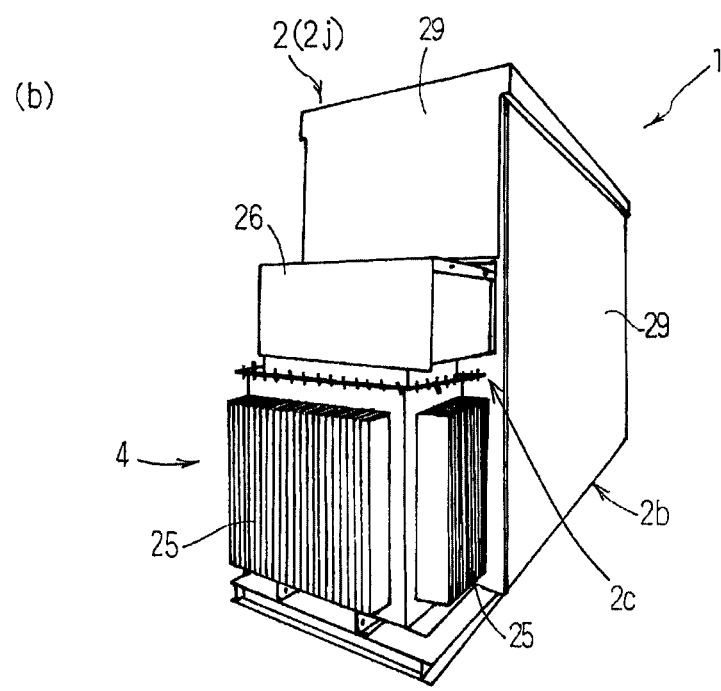

As shown in FIGS. 13 to 15, the power collection part 21 is positioned at the right part (the left part in FIG. 13) in the distributor housing 2, and the power collection part 21 is placed at the further right side from the conversion part 3.

Consequently, the power collection part 21 (the assisting apparatus 20) of the 2nd embodiment also are placed away from the transformer 4 with the power transmission part 5 as a center.

In the power collection part 21, the pairs of the right and left plural breakers 12 are arranged along an upward and downward direction.

The direct-current cable 11, which flows the direct current from the solar battery D through the below-mentioned connection box Z, is connected to the rear side of each breaker 12 from a left and low part of the distributor housing 2.

Figure 23:
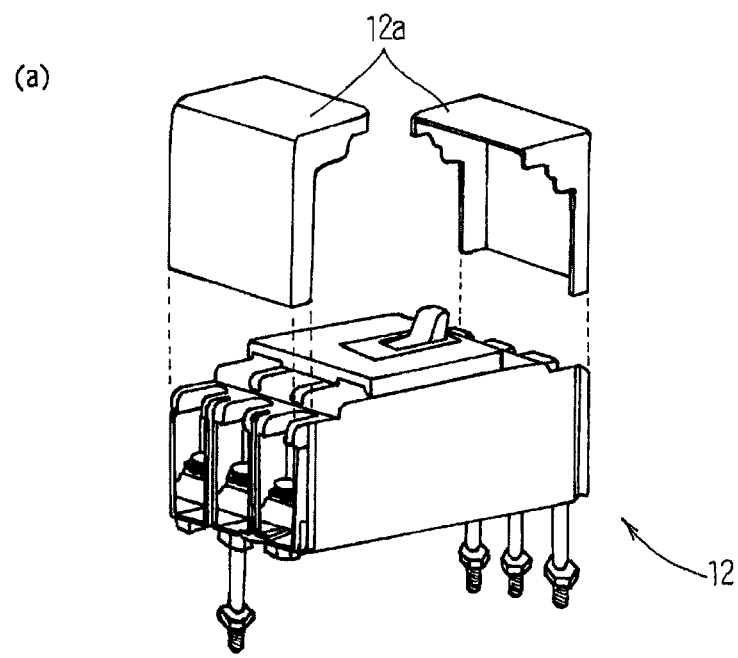
FIG. 23(a) shows a front perspective view of a breaker of the electric power distributor.
FIG. 23(b) shows a back perspective view of the breaker of the electric power distributor.
Figure 23:
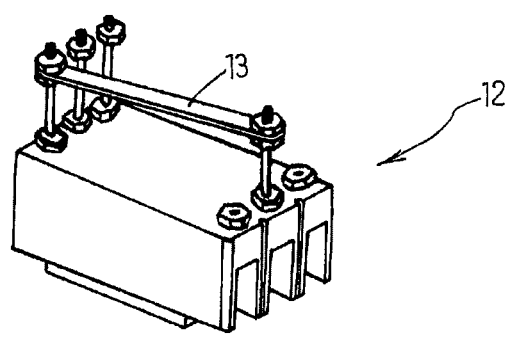

As shown in FIG. 23, each breaker 12 is breaker for three-phase alternating current, though a number of the terminals in the inflow side and the outflow side is each three, the T-phase terminal of the inflow side may be connected to the S-phase terminal of the outflow side by the connector, the remaining R-phase terminal and S-phase terminal of the inflow side may be connected to the positive and negative direct-current cable 11 from each connection box Z, the R-phase terminal and T-phase terminal of the outflow side may be connected to the positive and negative direct-current cable 11 toward the conversion part 3.

Furthermore, the connector 13 for the T-phase terminal of the inflow side and the S-phase terminal of the outflow side is not positioned at the right and left side faces of the breaker 12 as conventional, but is positioned only at the backward side (the rear face (the rear face member) 2b's side of the distributor housing 2), and we can utilize a space to place the connector 13 behind the adjacent plural breakers 12.

In addition to this, because each breaker 12 is placed closer in the front view, we can secure a wide space to arrange the direct-current cable 11 from the front of the power collection part 21, at the same time, we can make all of the power collection part 21 and the electric power distributor 1 compact.

Furthermore, breaker 12 may comprise a cover 12a to cover each terminal of the inflow side and the outflow side.

And, because the direct-current cable 11 from the connection box Z can be connected to breaker 12 in the distributor housing 2, and the connecting portion isn't exposed to wind and rain et cetera, a construction property of cable also is enhances. Moreover, the connector 13 is a slender plate member having an electric conductivity, and the connector 13 is fixed by a fixture of a nut et cetera to lock the both end of the connector 13 in a bar body which is extended backward from the rear face of the breaker 12.

<The Conversion Part 3>

Figure 24:
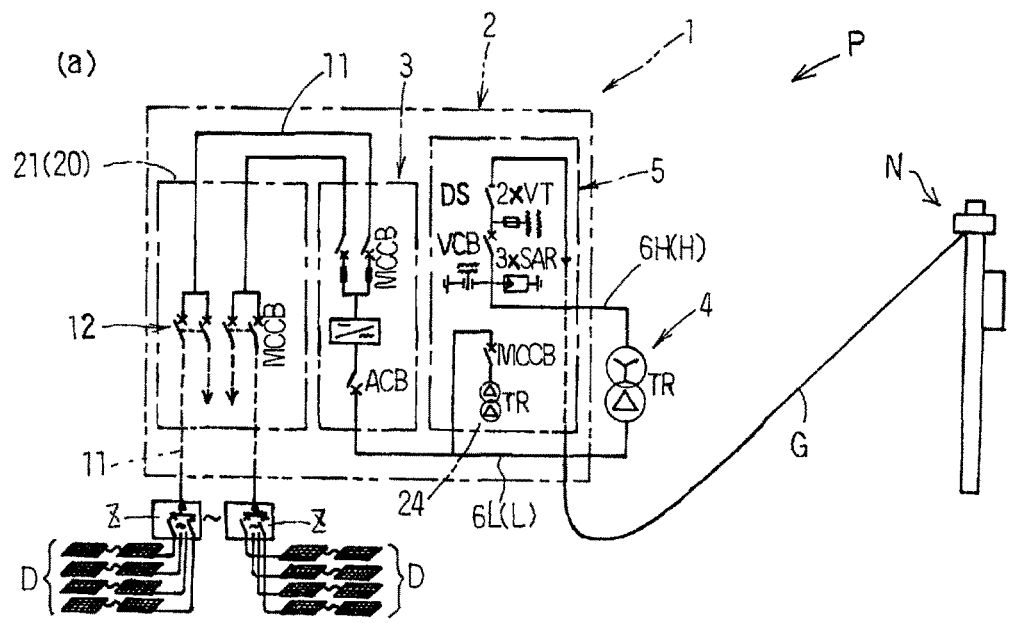
FIG. 24(a) shows a schematic view of a solar power generation plant which comprises the plural electric power distributors of the 2nd embodiment of the present invention.
FIG. 24(b) shows a schematic view of a placement of the electric power distributor and solar batteries.
Figure 24:
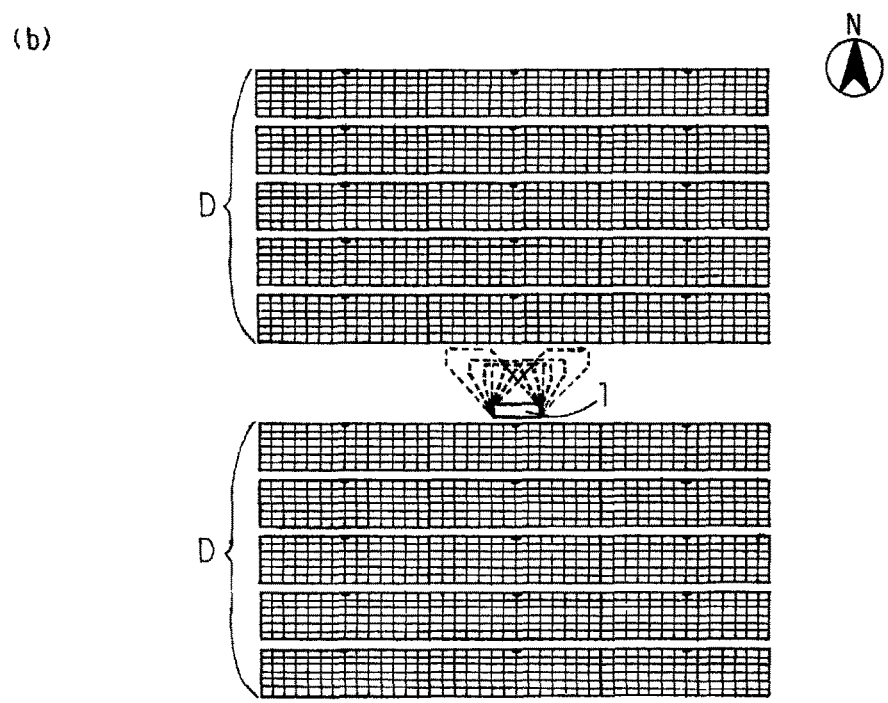

As shown in FIGS. 13, 14, 24, the conversion part 3 is only one, and is positioned at a center part in the rightward and leftward in the distributor housing 2.

That is, the conversion part 3 of the 2nd embodiment also is placed away from the transformer 4 with the power transmission part 5 as a center.

The rotary fan-shaped ventilator device 9 to release the air of an inner part of the ventilator device 9 upward is placed at an upper face of the converter housing 14 of the conversion part 3.

Furthermore, the ventilation from the ventilator device 9 is blown to the directly-faced inner face 2f (the inner ceiling face 2g (an inner face of the ceiling face member 2g) et cetera) of distributor housing 2 (that is, the inner ceiling face 2g (the inner face of the ceiling face member 2g) relieves the ventilation from the ventilator device 9), and the support member 10, which suppresses the protruding height on the inner face 2f by cutting off the projected portion from the inner face 2f, is placed at the close left side to the ventilator device 9 in the plane view (refer to FIG. 13). The ventilation from the ventilator device 9 flows along the inner ceiling face 2g (the inner face of the ceiling face member 2g), according to suppressing the protruding height of the support member 10, and the ventilation from the ventilator device 9 doesn't stay to flow in a otiose whirl, and the conversion part 3 is cooled sufficiently, because the convective flow is generated in the distributor housing 2. Furthermore, like FIG. 22, the protruding height of the middle part in the forward and backward direction of the support member 10 may be suppressed to be approximately flush with the inner ceiling face 2g (the inner face of the ceiling face member 2g).

<The Transformer 4>

As shown in FIGS. 13 to 21, the transformer 4, in the same way as the 1st embodiment, transforms the low-voltage alternating current L from the conversion part 3 to the high-voltage alternating current H which is suitable for the power transmission.

The transformer 4 comprises the plural radiation fins 25, and a connection cover 26, and the connection cover 26 covers a connecting portion (connection terminal) 4La to 4Lc with the low-voltage bundle 8L of the low-voltage cables 6L from the distributor housing 2 to the transformer 4, and a connecting portion (connection terminal) 4Ha to 4Hc with the high-voltage bundle 8H of the high-voltage cables 6H to the transformer 4.

In particular, as shown in FIGS. 17 to 21, the low-voltage bundle 8L of the low-voltage cables 6L and high-voltage bundle 8H of the high-voltage cables 6H go out the upper side of the transformer 4 in the outside of the distributor housing 2 through one insertion hole 27 (the position across inside and outside of the distributor housing 2) which is placed near the rear face (the rear face member) 2b of the distributor housing 2.

The low-voltage bundle 8L of the low-voltage cables 6L may be arranged at the closer position to the distributor housing 2 and lower position than the high-voltage bundle 8H of the high-voltage cables 6H in the outside of the distributor housing 2, in particular, the high-voltage bundle 8H comprises the portion which each high-voltage cable 6H is non-overlapped in any view of the plane view, the front view and the side view.

And, about some of the mentioned low-voltage cable 6L and the high-voltage cable 6H, the low-voltage cable 6L also may be longer than the high-voltage cable 6H in the electric power distributor 1 of the 2nd embodiment.

This is because a support part member 28 which supports each high-voltage cable 6H comprises a 1st support part 28a which stands from on the connection cover 26's inner face of the transformer 4 toward the distributor housing 2 side, a 2nd support part 28b which extends from a pointed end of the 1st support part 28a downward, and a 3rd support part 28c which extend from the lower end of the 2nd support part 28b along a separating direction from the distributor housing 2, and the three high-voltage cables 6H are attached at a position which doesn't overlap in a up, down, right and left direction by each support part 28a to 28c.

Thus, we can achieve a stabilization of the thicken and heavy low-voltage bundle 8L of the low-voltage cables 6L, and we can make the electric power distributor 1 compact while enlarging a distance between each high-voltage cable 6H.

Figure 17:
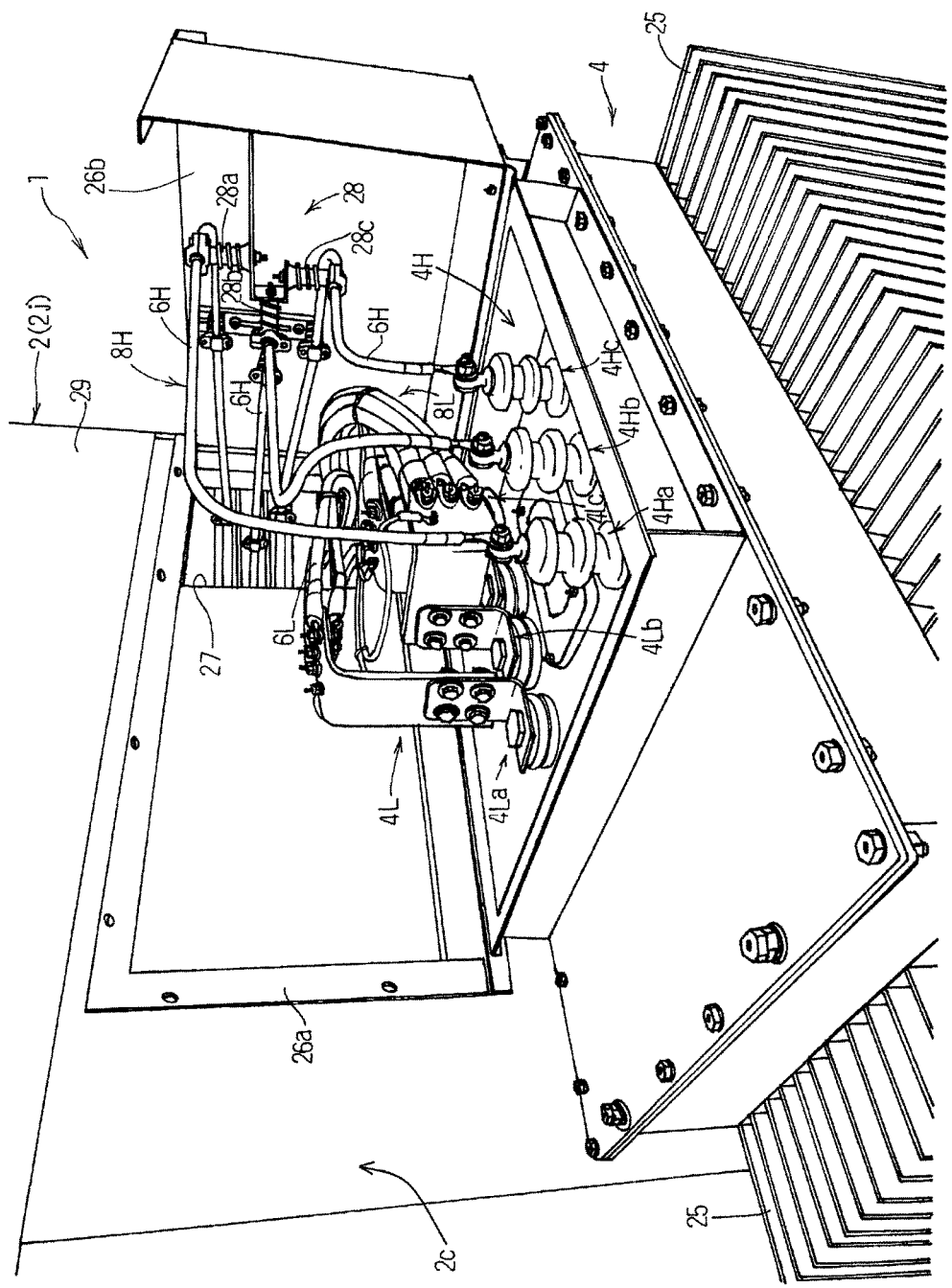
FIG. 17 shows a perspective view of the connecting portion of the low-voltage cable, the high-voltage cable and the transformer of the electric power distributor.
Figure 18:
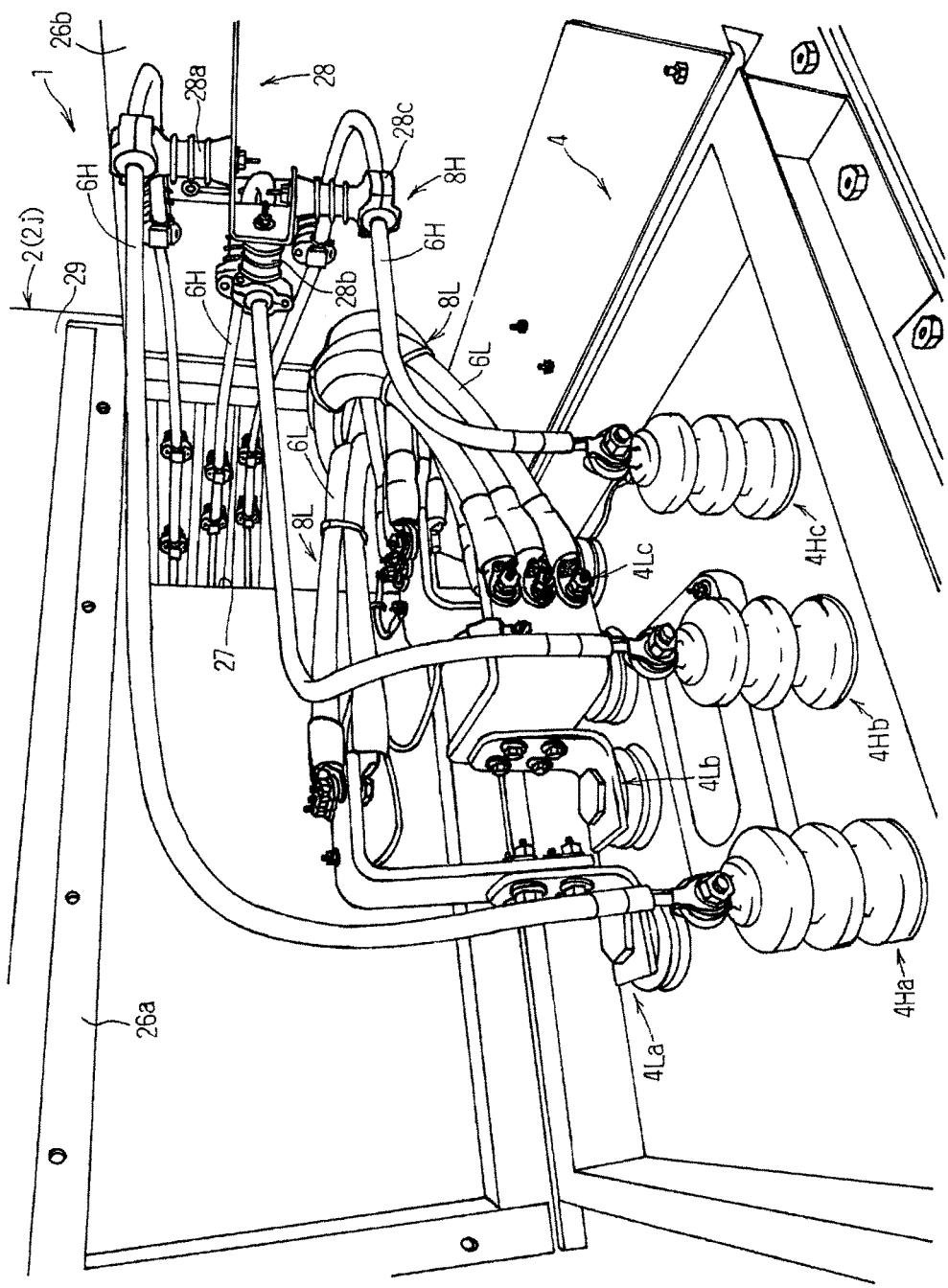
FIG. 18 shows a perspective view of the connecting portion of the low-voltage cable, the high-voltage cable and the transformer which is seen from a different angle from FIG. 17.
Figure 19:
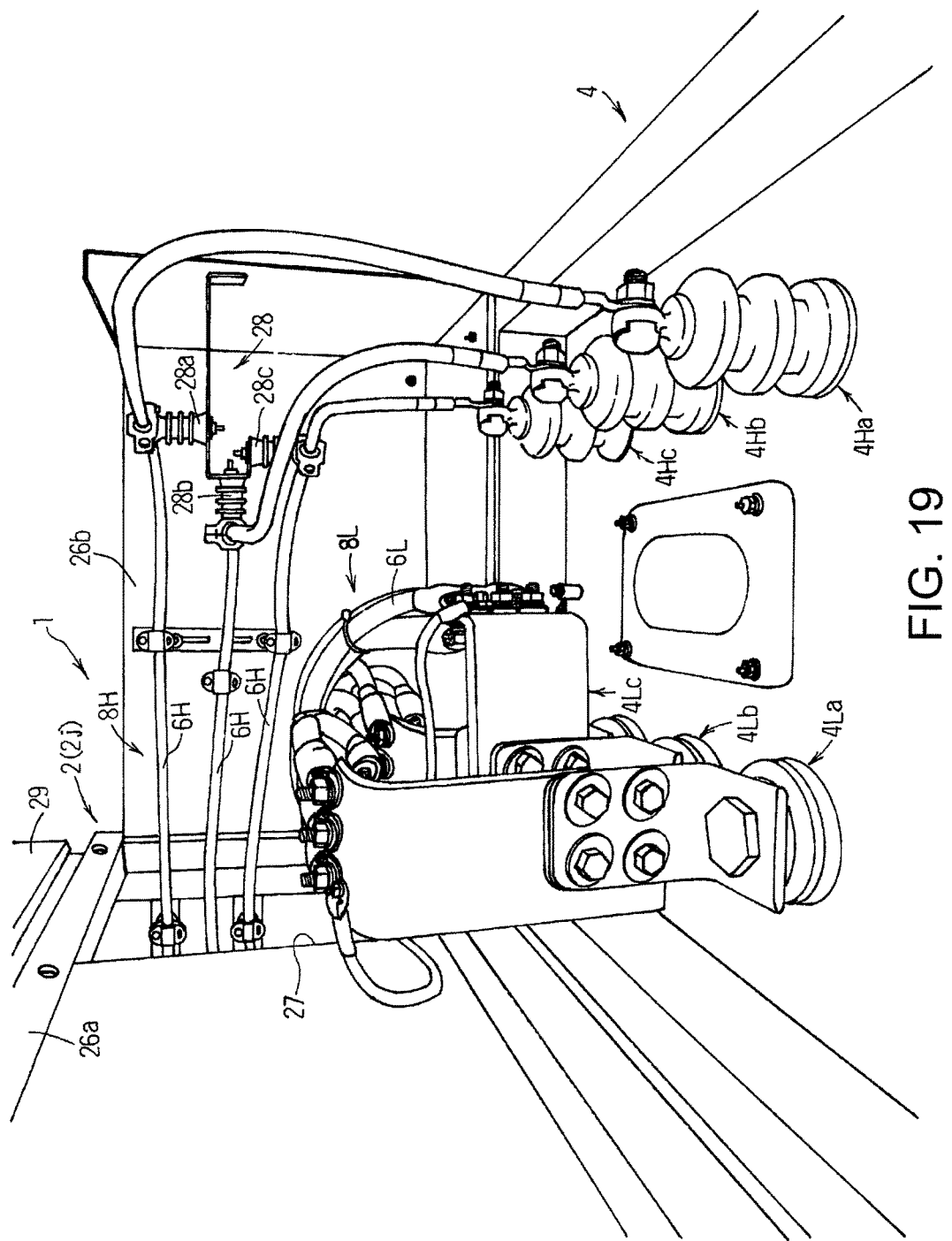
FIG. 19 shows an approximately front view of the connecting portion of the low-voltage cable, the high-voltage cable and the transformer.
Figure 20:
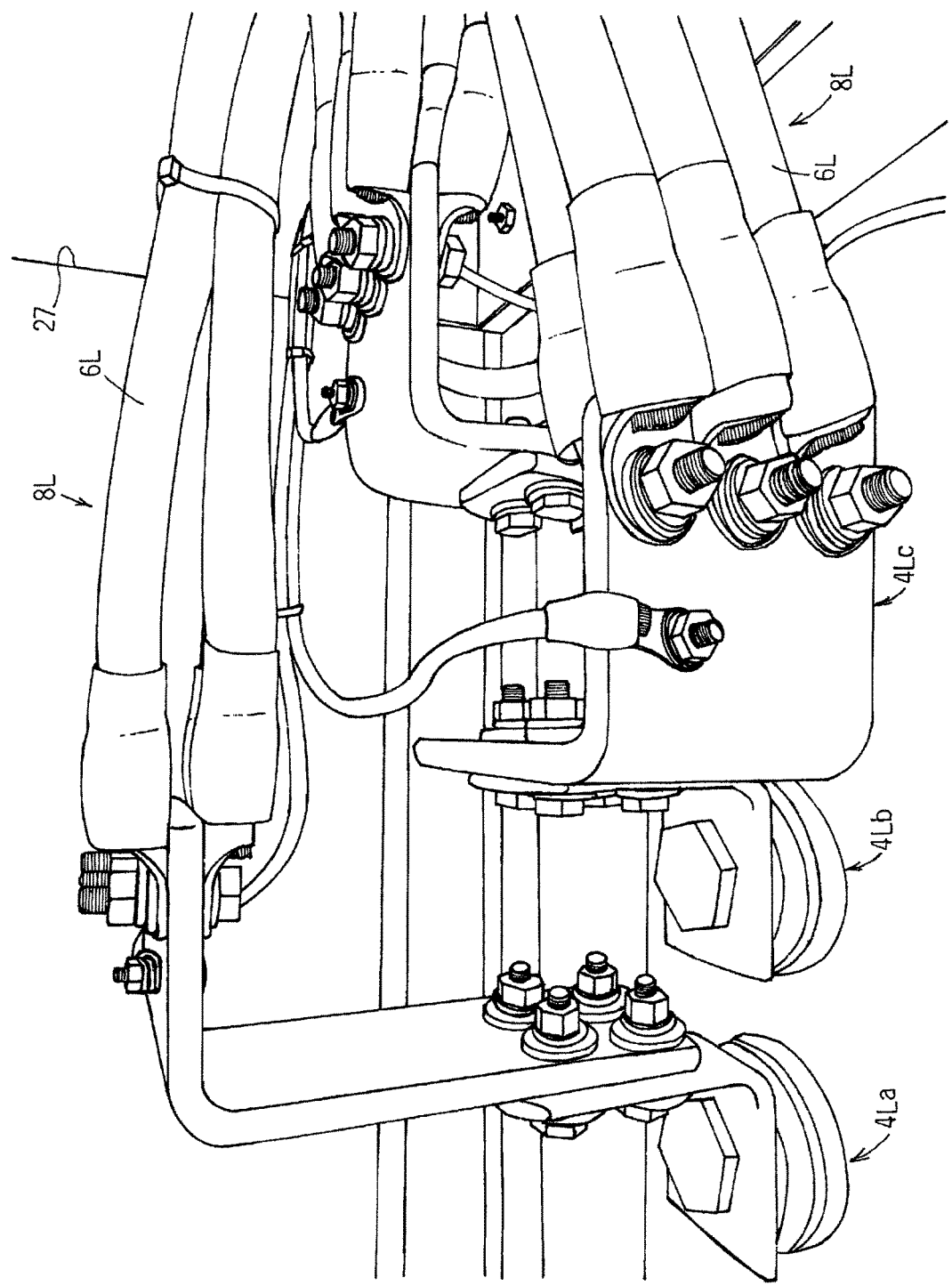
FIG. 20 shows an approximately side enlarged view of the connecting portion of the low-voltage cable and the transformer.

And, as shown in FIGS. 17, 18, if we just change a viewing angle slightly, it changes that the low-voltage cable 6L's connecting portion 4L which is seen from between each high-voltage cable 6H, it becomes further easy that a worker extends a hand from various angles and positions, and the worker does work of connection with the low-voltage bundle 8L to the transformer 4 et cetera.

As described in detail, in FIG. 17, we can see the connecting portion 4Lc of the low-voltage cable 6L between the connecting portions 4Ha and 4Hb of the high-voltage cables 6H. But, in FIG. 18 changed the viewing angle, we can see the connecting portion 4Lb of the low-voltage cable 6L between the connecting portions 4Ha and 4Hb of the high-voltage cable 6H, and we can see the connecting portion 4Lc of the low-voltage cable 6L between the connecting portions 4Hb and 4Hc of the high-voltage cable 6H.

Furthermore, an inner part of the connection cover 26 is hermetically sealed, according to attaching the connection cover 26 by the fixture of a screw et cetera at a contact part 26a (elastic material of rubber et cetera) which is placed at the left face 2c (the outer face of the left face member 2c) of the distributor housing 2 after mounting on an upper position of the transformer 4. And, the whole connection cover 26 can be removed easily from the transformer 4 only by removing the above fixture. Furthermore, the connection cover 26 may have a constitution which a rear part 26b remains on the upper face of the main body of the transformer 4 after removing the connection cover 26.

<The Power Transmission Part 5>

Figure 21:
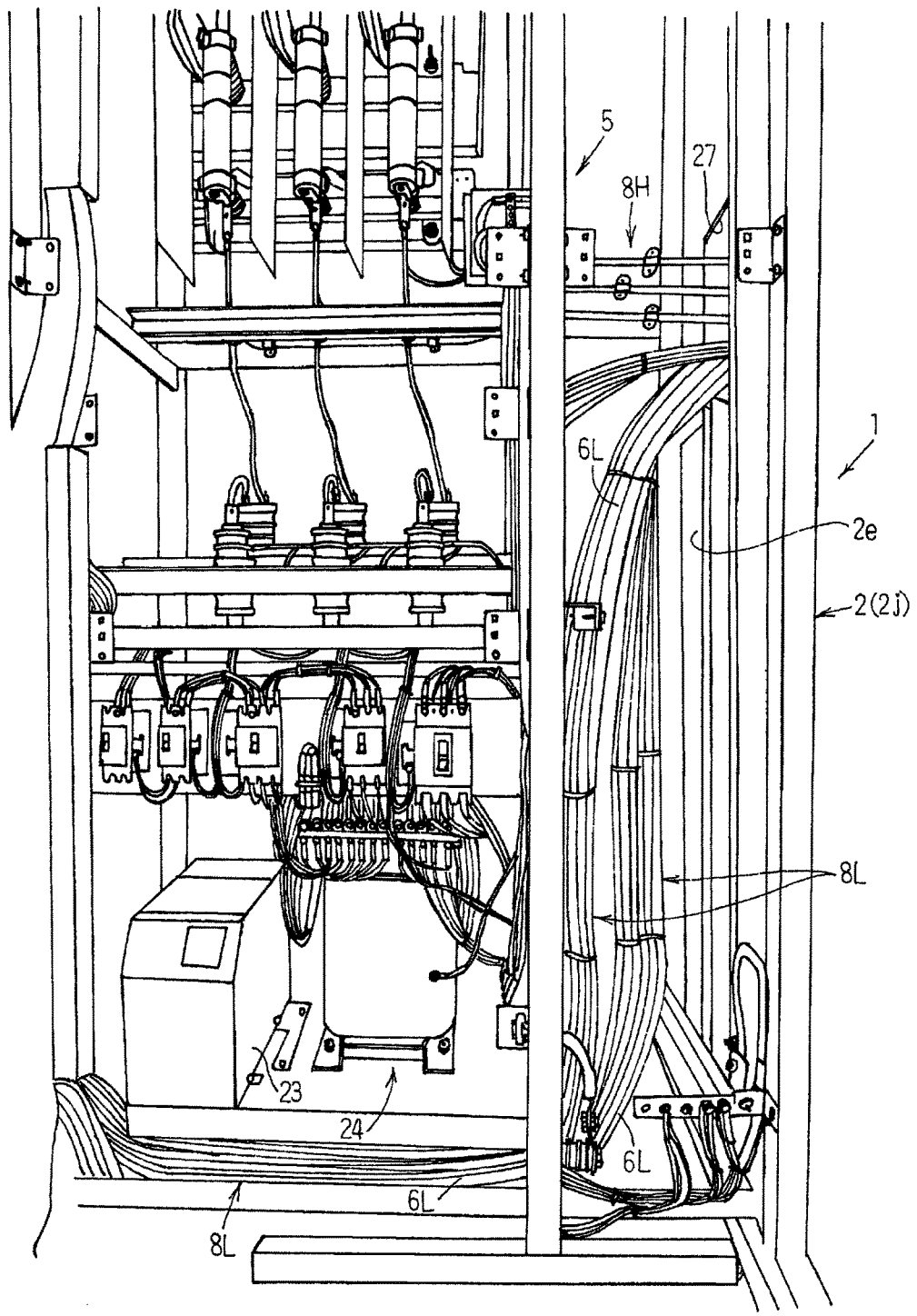
FIG. 21 shows a front schematic view of an internal placement of the low-voltage cable and the high-voltage cable on the inside of the distributor housing of the electric power distributor of the 2nd embodiment.

As shown in FIGS. 13, 21, the power transmission part 5 also, in the same way as the 1st embodiment, is positioned only at the left part (the right part in FIG. 13) which is the closest side to the transformer 4 in the distributor housing 2 (the left face (the left face member) 2c's side attaching the transformer 4).

The high-voltage cable 6H of the bundles 8L, 8H of each cable 6L, 6H, which goes in and out through the insertion hole 27 of the distributor housing 2, lengthens to nearby the VCB at an approximately same height as the insertion hole 27 or at a little higher position than the insertion hole 27 with regards to the power transmission part 5, and the high-voltage cable 6H is placed at an inconspicuous position which it is hard to reach.

Conversely, the low-voltage cable 6L lengthens downward along the inner side face 2e (the inner face of the side face member 2e (the left face member 2c, the right face member 2d)), immediately after going in the inner part of the distributor housing 2 from the insertion hole 27, in the case of connecting with the transformer 4 to the conversion part 3, and the low-voltage cable 6L is connected to the conversion part 3 after lengthening leftward along an inner floor face 2h (an inner face of a floor face member 2h), and the low-voltage cable 6L is kept away from the power transmission part 5. Furthermore, it also can be said that the low-voltage cable 6L (the low-voltage bundle 8L), which passes under the power transmission part 5 shown in FIG. 21, is arranged at this side (an apart position from a distributor housing's face member 2j (the rear face member 2b) near the above-mentioned distributor housing's inside space 16.

<The Air Conditioner 22, UPS 23, Auxiliary Machine 24>

As shown in FIG. 13, the air conditioner 22 is placed one by one at the upper part of the right and left part of the electric power distributor 1 (in the distributor housing 2) and at a middle position in the forward and backward direction in the front view, the UPS 23 and the auxiliary machine 24 are placed under the power transmission part 5.

Figure 22:
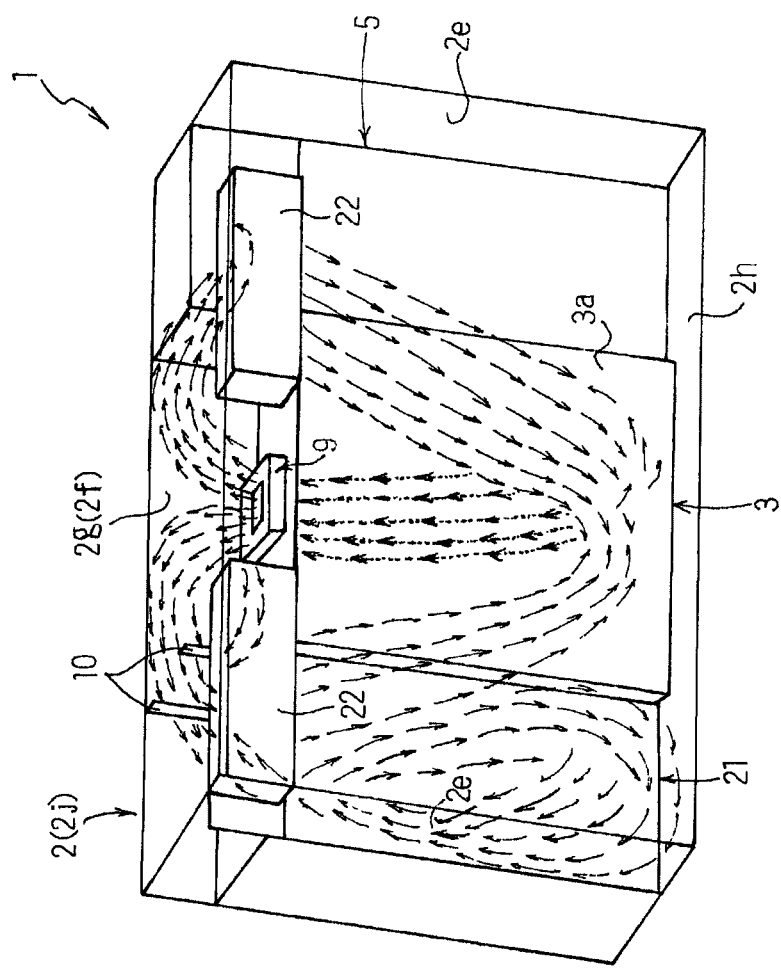
FIG. 22 shows a schematic view of the convective flow of the air on the inside of the distributor housing of the electric power distributor of the 2nd embodiment.

In FIG. 22, a state of the convective flow in the distributor housing 2 is shown. As described in detail, we secure a flow of the wind between the ventilator device 9 and the air conditioner 22 by the above cutting-off support member 10 et cetera, because an intake port of the air conditioner 22 is placed near one end of a right and left side of the air conditioner 22 though the intake port of the air conditioner 22 is placed at a position (an upper face or a back face) which the ventilation from the above ventilator device 9 flows into.

The ventilation from the air conditioner 22 goes in the inner part of the conversion part 3 from a lower part of the conversion part 3, and is ventilated upward by the ventilator device 9, and goes back to the air conditioner 22 again, according to ventilating along a front inner face (a reverse face (a rear face) of the door 7) and ventilating to a center in the rightward and leftward of the air conditioners 22 mutually.

And, similarly, the ventilation of the air conditioner 22 is a flow which enters also in inner parts of the power collection part 21, the UPS 23 and the auxiliary machine 24 from below, and passes through upward, and goes back to the air conditioner 22 again.

<The Solar Power Generation Plant P>

FIG. 24 shows the solar power generation plant P which comprises the electric power distributors 1 of the 2nd embodiment of the present invention.

The solar power generation plant P is different from the solar power generation plant P which comprises the electric power distributors 1 of the 1st embodiment, and the solar power generation plant P doesn't comprise the electric power transmitter M.

And, the solar battery D may be arrayed depending on the extent and the shape of the land to install the solar batteries D, for example, and the solar batteries D of sum total 84 pieces of 6 stages×14 columns are conducted to the one connection box Z, and if 30 sets of the solar batteries D of sum total 84 pieces are installed, 2520 sheets of the solar batteries D may be installed in a land of about 85 m in a north-south direction×about 70 m in an east-west direction (refer to FIG. 24(b)), and if generation power per 1 sheets of the solar battery D is 250 W, standard array output of the solar batteries D is 630 kW by nominal value.

As the other array, the same 2520 sheets of the solar batteries D may be installed as 15 sets of the solar batteries D of sum total 168 pieces of 4 stages×42 columns conducted to the one connection box Z, and 15 sets of the solar batteries D of sum total 168 pieces of 6 stages×28 columns conducted to the one connection box Z may be collected into the one electric power distributor 1, and 10080 sheets of the solar batteries D may be arrayed (the standard array output of the solar batteries D is 2520 kW by the nominal value), according to comprising the four electric power distributor which collects 2520 sheets of the solar batteries D.

Furthermore, the solar batteries D and the connection boxed Z are split 15 sets into north and south, and the electric power distributor 1 is installed at a center between the north part and the south part (for the purpose of uniformizing of a length and shortening of the direct-current cable 11). And, the rear outer face (the outer face of the rear face member 2b) of the distributor housing 2 faces south, and the left outer face (the outer face of the left face member 2c) attached the transformer 4 of the distributor housing 2 faces west for the purpose that the door 7 of the electric power distributor 1 is placed to face north.

Other constitution, operation, effect and use mode of the electric power distributor 1 and the solar power generation plant P which comprises the electric power distributor 1 of the 2nd embodiment are same as the 1st embodiment.

The 3rd Embodiment

Figure 25:
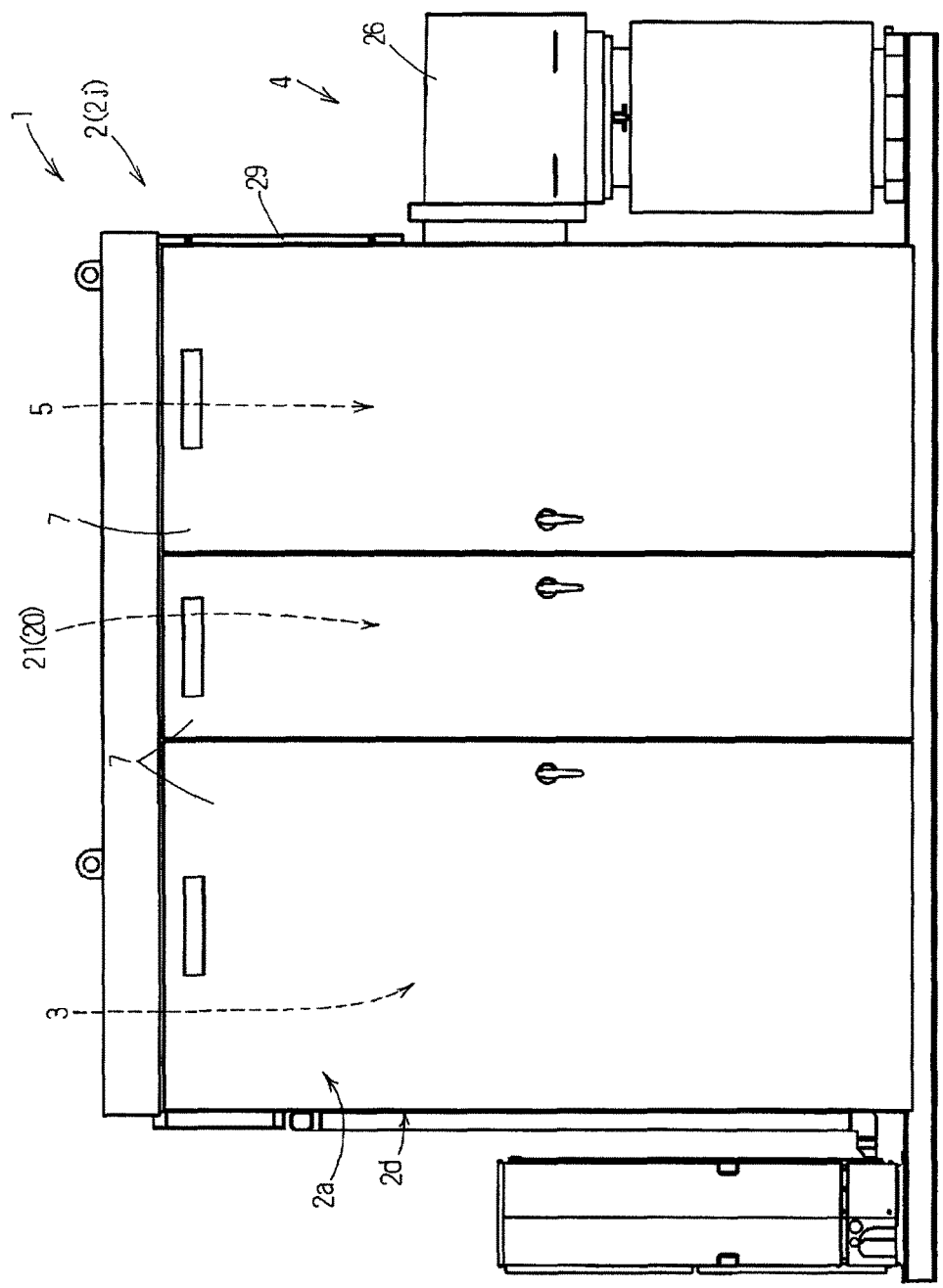
FIG. 25 shows a front schematic view of the electric power distributor of the 3rd embodiment of the present invention.

In FIG. 25, the electric power distributor 1 of the 3rd embodiment of the present invention is shown.

Different points between the 3rd embodiment, and the 1st, the 2nd embodiments are points that the electric power distributor 1 comprises only one conversion part 3, and also the power collection part 21 (the assisting apparatus 20) is positioned between the conversion part 3 and the power transmission part 5.

That is, the electric power distributor 1 of the 3rd embodiment comprises the one conversion part 3, the one transformer 4, the one power transmission part 5 and the one power collection part 21, and the conversion part 3, the power collection part 21, the power transmission part 5 and the transformer 4 are placed along the direction from the left face 2c (the left face member 2c) toward the right face 2d (the right face member 2d) in this order.

In other words, instead of this, the transformer 4 and the power transmission part 5 are placed along the predetermined direction in this order, and also the conversion part 3 and the assisting apparatus 20 are placed away from the transformer 4 with the power transmission part 5 as a center.

Other constitution, operation, effect and use mode of the electric power distributor 1 and the solar power generation plant P which comprises the electric power distributor 1 of the 3rd embodiment are same as the 1st, the 2nd embodiments.

The 4th Embodiment

Figure 26:
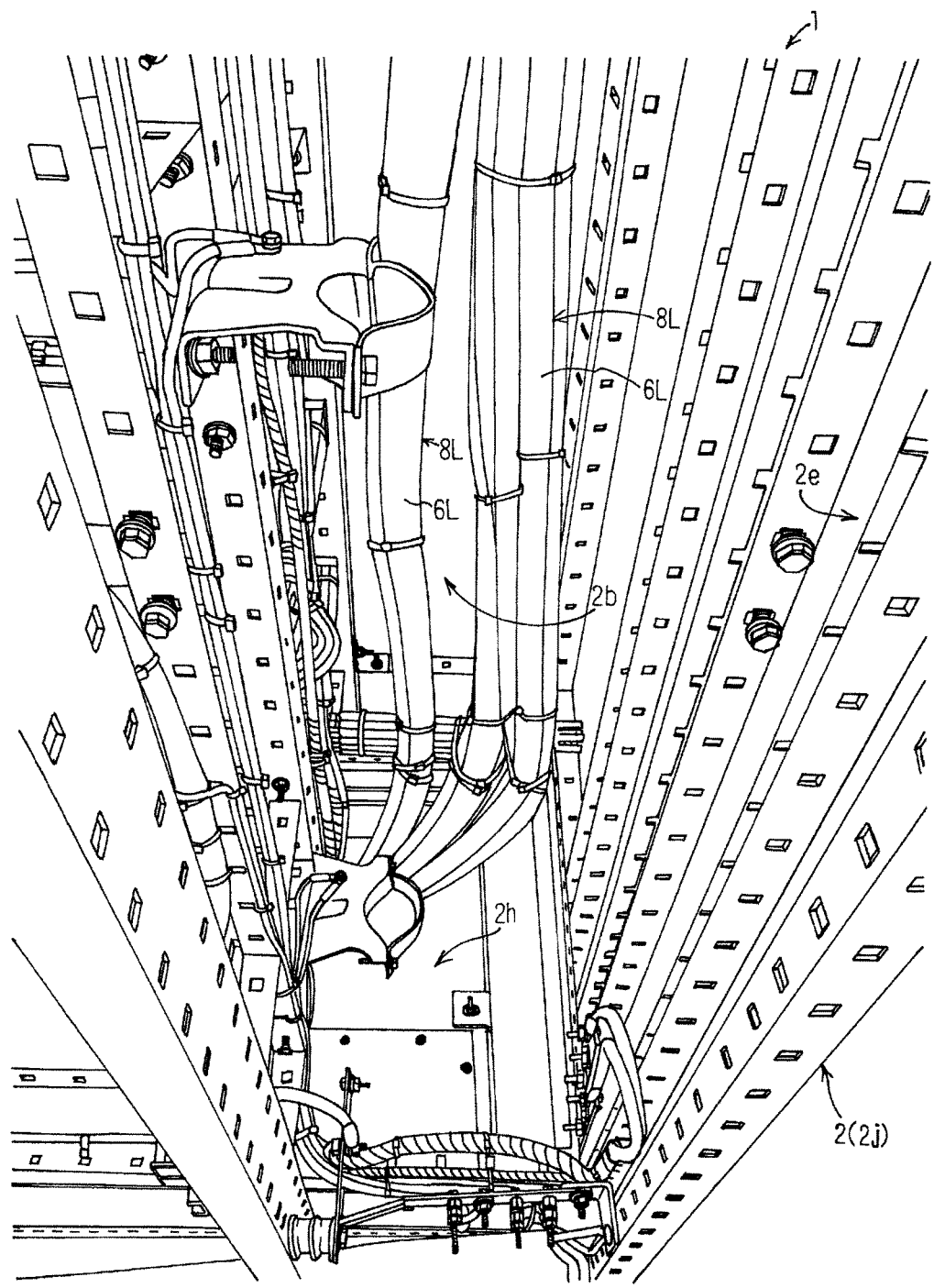
FIG. 26 shows a perspective view of the low-voltage cable of the electric power distributor of the 4th embodiment of the present invention.
Figure 27:
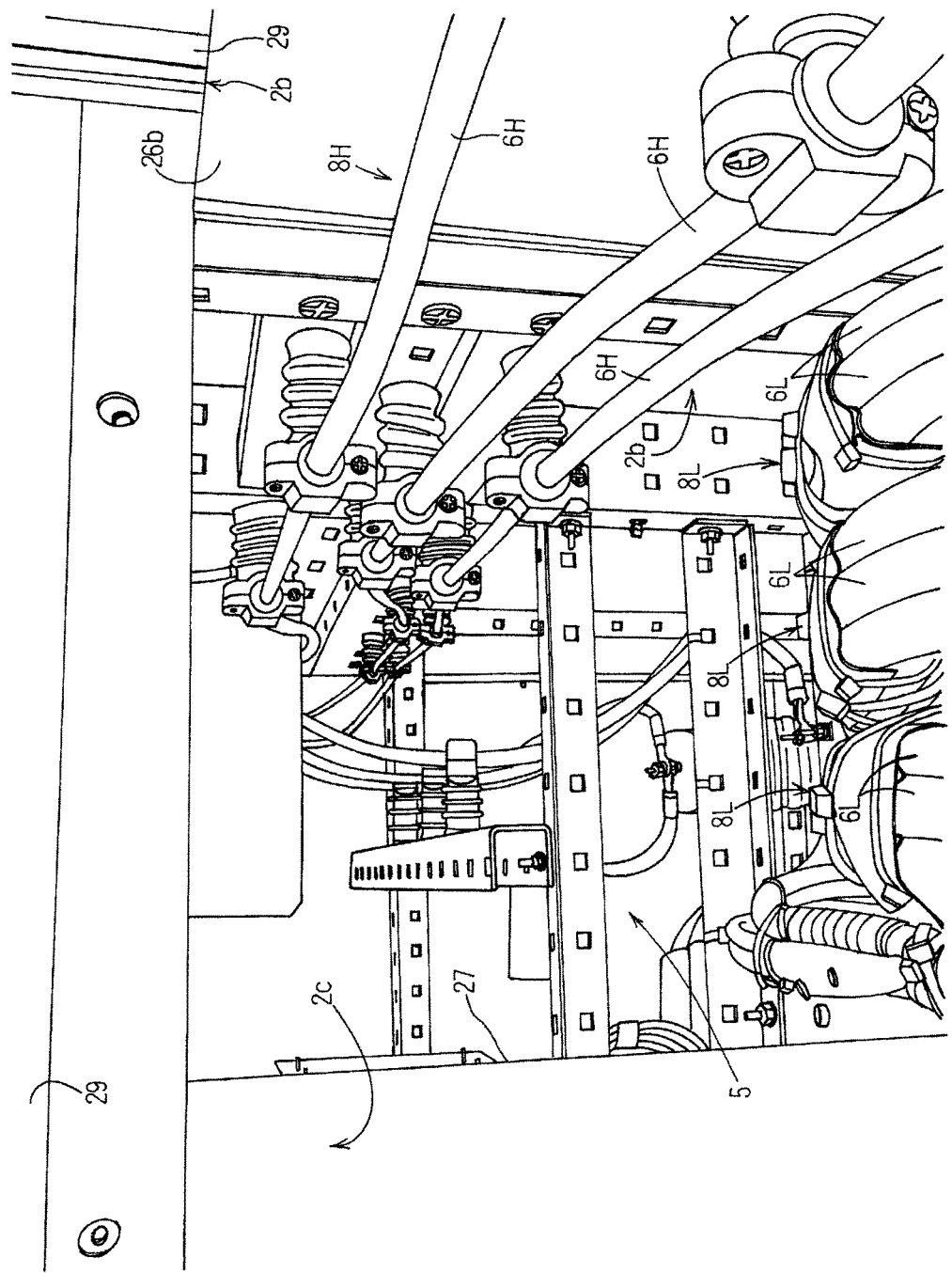
FIG. 27 shows a perspective view of the high-voltage cable of the electric power distributor of the 4th embodiment.

In FIGS. 26, 27, the electric power distributor 1 of the 4th embodiment of the present invention is shown.

A different point between the 4th embodiment, and the 1st to the 3rd embodiments is a point that the high-voltage cable 6H and the low-voltage cable 6L are arranged near the distributor housing's face member 2j at the opposite side to the distributor housing's inside space 16 which the user of said electric power distributor can move in the distributor housing 2, with regards to inside of the distributor housing 2. Furthermore, the 4th embodiment doesn't matter what number of the conversion part 3 the electric power distributor 1 comprises.

FIG. 26 shows that the low-voltage cable 6L (the low-voltage bundle 8L as the bundle of the low-voltage cables 6L) is arranged from nearby the insertion hole 27 downward and toward the floor face member 2h with regards to the inner part of the distributor housing 2, and the low-voltage cable 6L (the low-voltage bundle 8L) of the 4th embodiment is arranged along the inner side face 2e (the inner face of the side face member 2e (the left face member 2c, the right face member 2d)) of the distributor housing 2 near the rear face member 2b which is the distributor housing's face member 2j at the opposite side to the above-mentioned distributor housing's inside space 16 when the low-voltage cable 6L goes in and out through the insertion hole 27, and the low-voltage cable 6L is lengthened downward.

The portions which the low-voltage cable 6L is arranged near the rear face member 2b like this include not only a portion which the low-voltage cable 6L is lengthened downward, but also a portion which the low-voltage cable 6L passes under the power transmission part 5 to the conversion part 3.

FIG. 27 shows that the high-voltage cable 6H (the high-voltage bundle 8H as the bundle of the high-voltage cables 6H) is arranged from nearby the insertion hole 27 at the upper side of the transformer 4 in the outside of the distributor housing 2 inward the distributor housing 2 and toward the power transmission part 5, and the high-voltage cable 6H (the high-voltage bundle 8H) of the 4th embodiment also, in the same way as the low-voltage cable 6L (the low-voltage bundle 8L), is arranged near the rear face member 2b which is the distributor housing's face member 2j at the opposite side to the above-mentioned distributor housing's inside space 16 when the high-voltage cable 6H goes in and out through the insertion hole 27, and the high-voltage cable 6H is lengthened inward the distributor housing 2 at an approximately same height as the insertion hole 27.

Other constitution, operation, effect and use mode of the electric power distributor 1 and the solar power generation plant P which comprises the electric power distributor 1 of the 4th embodiment are same as the 1st to the 3rd embodiments.

<The Others>

The present invention is not limited the above-mentioned embodiments. Each constitution, whole construction, shape and/or dimension of the electric power distributor 1 et cetera can change appropriately in accordance with a purport of the present invention.

The electric power distributor 1 is available in the case of flowing in the alternating current in a wind power generation et cetera except the solar power generation.

A storage battery may be built in the electric power distributor 1, the storage battery may be charged in the case of generating a surplus of the power generation capacity of the solar power generation et cetera, the electric power from the storage battery may be supplied to amount used of each residence (consumer) in the case that the power generation capacity reduces (in cloudy weather, in rainy weather and in the nighttime).

The inner face 2f of the distributor housing 2, specifically, means the faces at the inner side of the distributor housing 2 such as the inner ceiling face 2g (the inner face of the ceiling face member 2g), the inner side face 2e (the inner face of the side face member 2e (the left face member 2c, the right face member 2d)), the inner floor face 2h (the inner face of the floor face member 2h) and a rear face 2i of the door 7.

The distributor housing's face member 2j of the distributor housing 2 means the front face member 2a, the rear face member 2b, the left face member 2c, the right face member 2d, the ceiling face member 2g, the floor face member 2h and the door 7 et cetera.

Besides, the electric power distributor 1 may comprise a hook to lift up by a crane et cetera at the outer face of the ceiling face member 2g of the distributor housing 2, and the whole electric power distributor 1 lifted up by the hook may be put on a foundation (a groundsill) constructed in advance.

Material of the foundation may be any material such as a concrete-made, steel-made (H-shaped steel-made) and so on, a shape of the foundation also may be a mat foundation having an uniform thickness, and a geta foundation (a set of two foundation like teeth of a geta) having a dent et cetera which a space is formed below the floor face member 2h of the distributor housing 2.

Though the electric power distributor 1, in the above, comprises the two conversion parts 3 or the one conversion part 3, if the conversion part 3 is placed away from the transformer 4 with the power transmission part 5 as a center, the electric power distributor 1 may comprise three or more conversion parts 3, in this case, the three or more conversion parts 3 may be placed along the direction approximately orthogonal to the predetermined direction which the transformer 4 and the power transmission part 5 are placed along in this order. And, the two or three or more conversion parts 3 don't have to be placed along the direction approximately orthogonal to the predetermined direction.

The conversion part 3 may be placed at a position which the electric power distributor 1 doesn't comprise the distance K (the front distance Ka, rear distance Kb) between the power transmission part 5 and the conversion part 3, and/or the mutual distance K'. Because the electric power distributor 1 doesn't comprise these distance K, K', the conversion part 3, the power transmission part 5 and the power transmission part 5 are adjacent (close) to each other, just as much as the distance K, K' can make the distributor housing 2 further compact.

Furthermore, each conversion part 3 is placed at a position which each conversion part 3 turn their backs on each other, and their backs are adjacent, in the case that the two conversion part 3 are placed at the position which the electric power distributor 1 doesn't comprise at least the mutual distance K', and the electric power distributor 1 may comprise a door to open and close each conversion part 3 et cetera at the front face (the front face member) 2a and the rear face (the rear face member) 2b of the distributor housing 2 like the power transmission part 5.

If the ventilator device 9 releases the air from the inside of the conversion part 3, the ventilator device 9 isn't placed at the upper face of the converter housing 14, the ventilator device 9 may be placed at the front face of the converter housing 14 et cetera.

And, the position relieved the ventilation of the ventilator device 9 includes not only a position relieved the ventilation of the ventilator device 9 from right in front, like the inner ceiling face 2g (the inner face of the ceiling face member 2g) which faces directly to the ventilator device 9 placed at the upper face of the converter housing 14, but also a position which the ventilation of the ventilator device 9 blows against by the convective flow of the air in the distributor housing 2, like the inner side face 2e (the inner face of the side face member 2e (the left face member 2c, the right face member 2d)), the inner floor face 2h (the inner face of the floor face member 2h) and the rear face 2i of the door 7 and so on.

The entrance door 7b may be placed at the opposite side to the transformer 4 in the distributor housing 2. In this case, the two conversion parts 3 (each conversion part 3) may be placed to be adjacent (contacted) to the power transmission part 5, the low-voltage part 15 may be placed at a same space as the power transmission part 5.

INDUSTRIAL APPLICABILITY

The electric power distributor 1 can be used for a system to generate electricity with generator (motor) rotated by the wind power, the water power, and the wave power et cetera except the solar power generation plant, and the electric power distributor 1 is available regardless of outdoor or indoor.

EXPLANATION OF NUMERALS AND SYMBOLS 1 electric power distributor
2 distributor housing
3 conversion part
4 transformer
5 power transmission part
16 distributor housing's inside space
6L low-voltage cable
6H high-voltage cable
20 assisting apparatus
L low-voltage alternating current
H high-voltage alternating current

The invention claimed is:

1. An electric power distributor comprising;
a distributor housing;
conversion parts which convert direct current or alternating current from outside of the distributor housing to low-voltage alternating current;
a transformer which transforms the low-voltage alternating current from the conversion parts to high-voltage alternating current which is at a higher-voltage than the low-voltage alternating current; and
a power transmission part which transmits the high-voltage alternating current from the transformer to the outward distributor housing, wherein
the distributor housing comprises the two conversion parts and the power transmission part inside thereof,
the transformer is attached to the distributor housing from outside,
the electric power distributor comprises a low-voltage cable which causes the low-voltage alternating current to flow from each of the conversion parts to the transformer, and a high-voltage cable which causes the high-voltage alternating current to flow from the one transformer to the power transmission part,
the transformer and the power transmission part are placed along a predetermined direction in this order, and
the two conversion parts are placed along a direction approximately orthogonal to the predetermined direction at an opposite side to the transformer with regards to the power transmission part.

2. The electric power distributor as claimed in claim 1, wherein
the electric power distributor comprises two sets of low-voltage bundles which are formed of the plural low-voltage cables gathered, and comprises one set of high-voltage bundle which is formed of the plural high-voltage cables gathered, and the two sets of the low-voltage bundles and the one set of the high-voltage bundles are arranged in parallel at one position across inside and outside of the distributor housing.

3. The electric power distributor as claimed in claim 1, wherein
each of the conversion parts and the power transmission part are placed within a distance of each other, and
the conversion parts are mutually placed within a distance of each other.

4. An electric power distributor comprising;
a distributor housing;
a conversion part which converts direct current or alternating current from outside of the distributor housing to low-voltage alternating current;
a transformer which transforms the low-voltage alternating current from the conversion part to high-voltage alternating current which is at a higher-voltage than the low-voltage alternating current;
a power transmission part which transmits the high-voltage alternating current from the transformer to the outward distributor housing; and
an assisting apparatus which assists the transmission of the power transmission part, the conversion of the conversion part and the transformation of the transformer, wherein
the distributor housing comprises the conversion part, the power transmission part and the assisting apparatus inside thereof,
the transformer is attached to the distributor housing from outside,
the electric power distributor comprises a low-voltage cable which causes the low-voltage alternating current to flow from the conversion part to the transformer, and a high-voltage cable which causes the high-voltage alternating current to flow from the transformer to the power transmission part,
the transformer and the power transmission part are placed along a predetermined direction in this order, and
the conversion part and the assisting apparatus are placed away from the transformer with the power transmission part as a center.

5. An electric power distributor comprising;
a distributor housing;
a conversion part which converts direct current or alternating current from outside of the distributor housing to low-voltage alternating current;
a transformer which transforms the low-voltage alternating current from the conversion part to high-voltage alternating current which is at a higher-voltage than the low-voltage alternating current; and
a power transmission part which transmits the high-voltage alternating current from the transformer to the outward distributor housing, wherein
the distributor housing comprises the conversion part and the power transmission part inside thereof,
the transformer is attached to the distributor housing from outside,
a low-voltage cable which causes the low-voltage alternating current to flow from the conversion part to the transformer is longer than a high-voltage cable which causes the high-voltage alternating current to flow from the transformer to the power transmission part, and
the high-voltage cable and the low-voltage cable are arranged near a distributor housing's face member at an opposite side to a distributor housing's inside space in which a user of said electric power distributor can move in the distributor housing, with regards to inside of the distributor housing.

6. An electric power distributor comprising;
a distributor housing;
a conversion part which converts direct current or alternating current from outside of the distributor housing to low-voltage alternating current;
a transformer which transforms the low-voltage alternating current from the conversion part to high-voltage alternating current which is at a higher-voltage than the low-voltage alternating current;
a power transmission part which transmits the high-voltage alternating current from the transformer to the outward distributor housing; and
an assisting apparatus which assists the transmission of the power transmission part, the conversion of the conversion part and the transformation of the transformer, wherein
the distributor housing comprises the conversion part, the power transmission part and the assisting apparatus inside thereof,
the transformer is attached to the distributor housing from outside,
the electric power distributor comprises a low-voltage cable which causes the low-voltage alternating current to flow from the conversion part to the transformer, and a high-voltage cable which causes the high-voltage alternating current to flow from the transformer to the power transmission part,
the transformer and the power transmission part are placed along a predetermined direction in this order, and
the conversion part is placed away from the transformer with the power transmission part as a center.

7. The electric power distributor as claimed in claim 2, wherein
each of the conversion parts and the power transmission part are placed within a distance of each other, and
the conversion parts are mutually placed within a distance of each other.

8. An electric power distributor comprising;
a distributor housing;
a conversion part which converts direct current or alternating current from a solar battery outside of the distributor housing to low-voltage alternating current;
a transformer which transforms the low-voltage alternating current from the conversion part to high-voltage alternating current which is at a higher-voltage than the low-voltage alternating current;
a power transmission part which transmits the high-voltage alternating current from the transformer to the outward distributor housing; and
an assisting apparatus which assists the transmission of the power transmission part and the transformation of the transformer, wherein
the distributor housing comprises the conversion part, the power transmission part and the assisting apparatus inside thereof,
the transformer is attached to the distributor housing from outside,
the electric power distributor comprises a low-voltage cable which causes the low-voltage alternating current to flow from the conversion part to the transformer, and a high-voltage cable which causes the high-voltage alternating current to flow from the transformer to the power transmission part, the transformer and the power transmission part are placed along a predetermined direction in this order, and the assisting apparatus is placed away from the transformer with the power transmission part as a center.

* * * * *